Jan. 12, 1932. L. E. LENTZ 1,840,630
RECORDING AND CARD PUNCHING MACHINE
Filed March 25, 1927 29 Sheets-Sheet 1

Inventor,
Laurence E. Lentz.
By L. F. Julihn
Attorney

Jan. 12, 1932.  L. E. LENTZ  1,840,630
RECORDING AND CARD PUNCHING MACHINE
Filed March 25, 1927  29 Sheets-Sheet 3

Inventor
Laurence E. Lentz
By L. G. Julihn
Attorney

Jan. 12, 1932.                L. E. LENTZ                1,840,630
                  RECORDING AND CARD PUNCHING MACHINE
                  Filed March 25, 1927     29 Sheets-Sheet 11
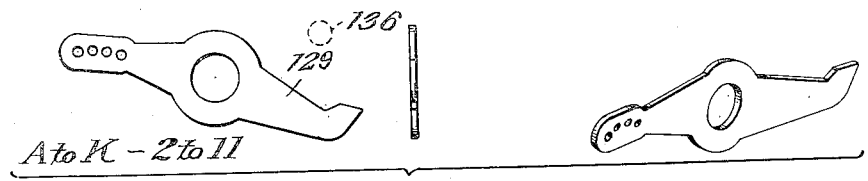
A to K – 2 to 11
*Fig. 11.*
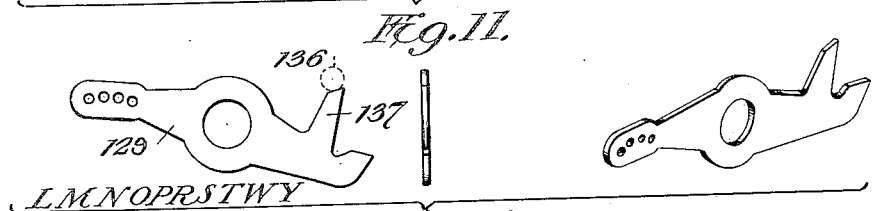
L M N O P R S T W Y
*Fig. 11ª*
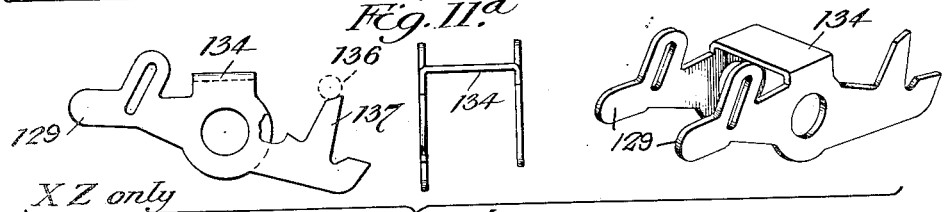
X Z only
*Fig. 11ᵇ*
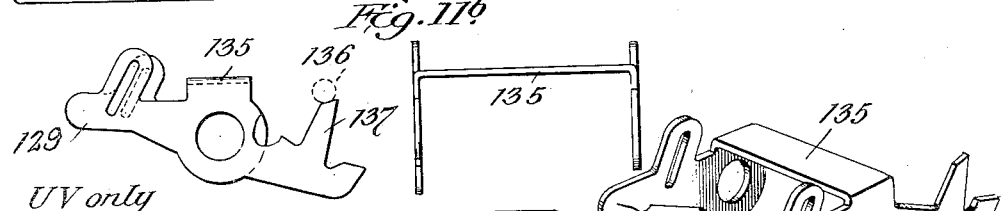
U V only
*Fig. 11ᶜ*
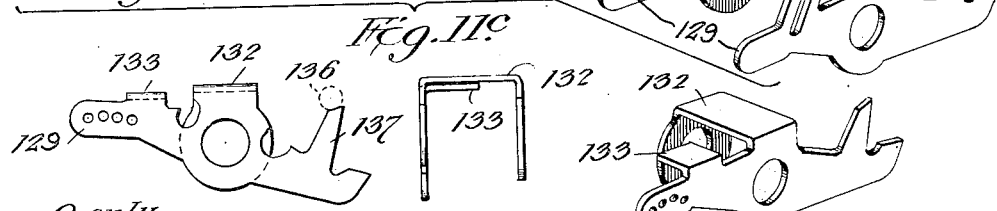
Q only
*Fig. 11ᵈ*
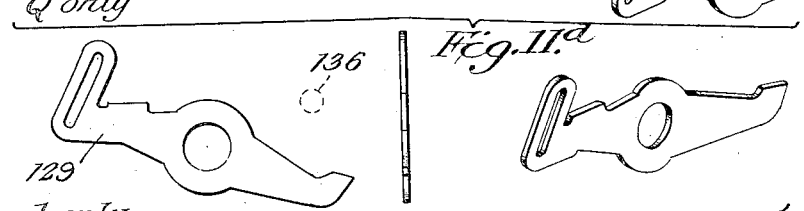
1 only
*Fig. 11ᵉ*
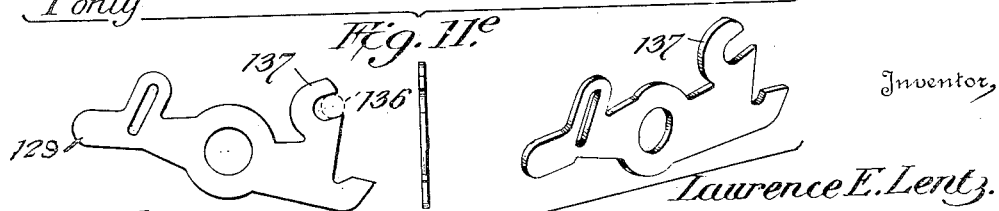
12 only
*Fig. 11ᶠ*
Inventor,
Laurence E. Lentz.
By L. G. Julilu
Attorney Jan. 12, 1932. L. E. LENTZ 1,840,630
RECORDING AND CARD PUNCHING MACHINE
Filed March 25, 1927 29 Sheets-Sheet 13
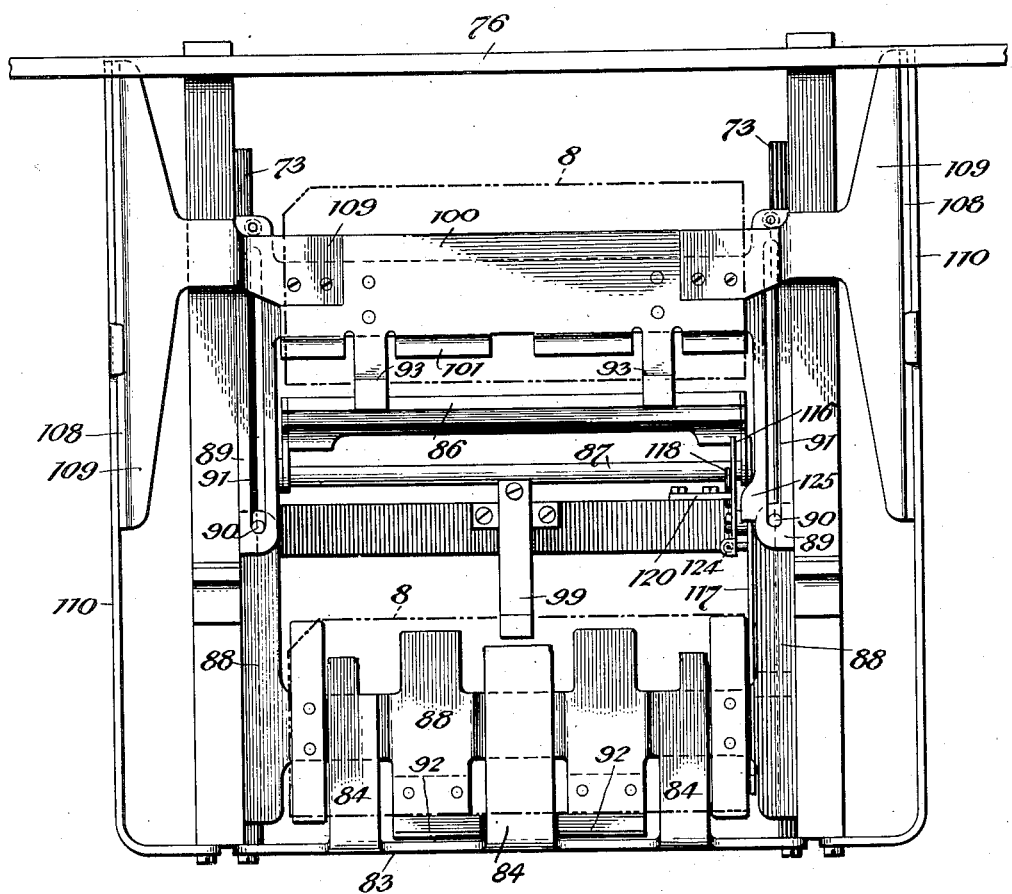
Fig. 13.
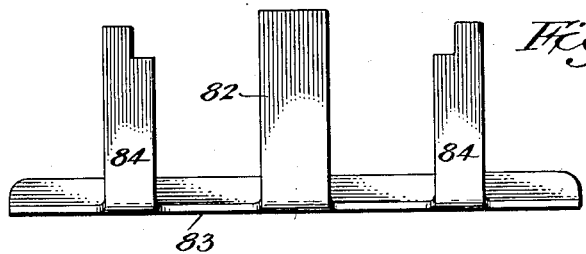
Fig. 13.ᵃ
Fig. 13.ᵇ
Inventor,
Laurence E. Lentz.
By
Attorney

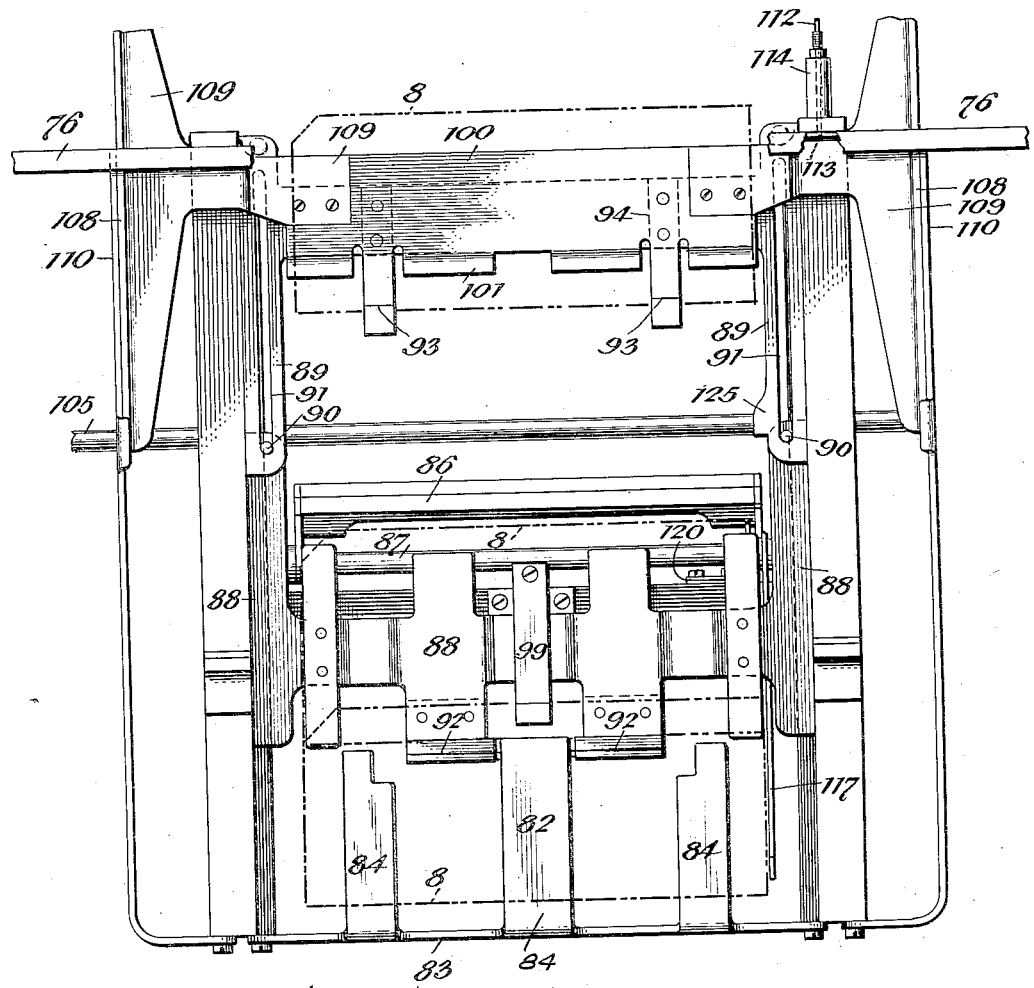
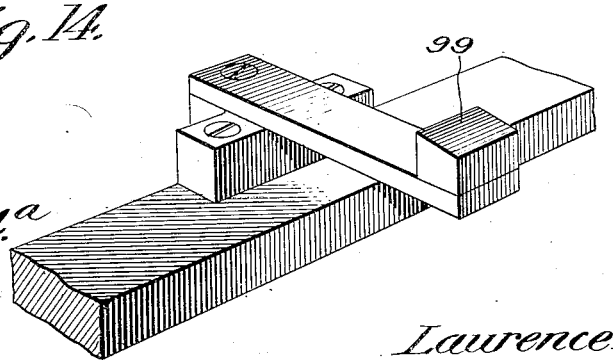
Fig. 14.
Fig. 14ᵃ.

Jan. 12, 1932.   L. E. LENTZ   1,840,630
RECORDING AND CARD PUNCHING MACHINE
Filed March 25, 1927   29 Sheets-Sheet 15
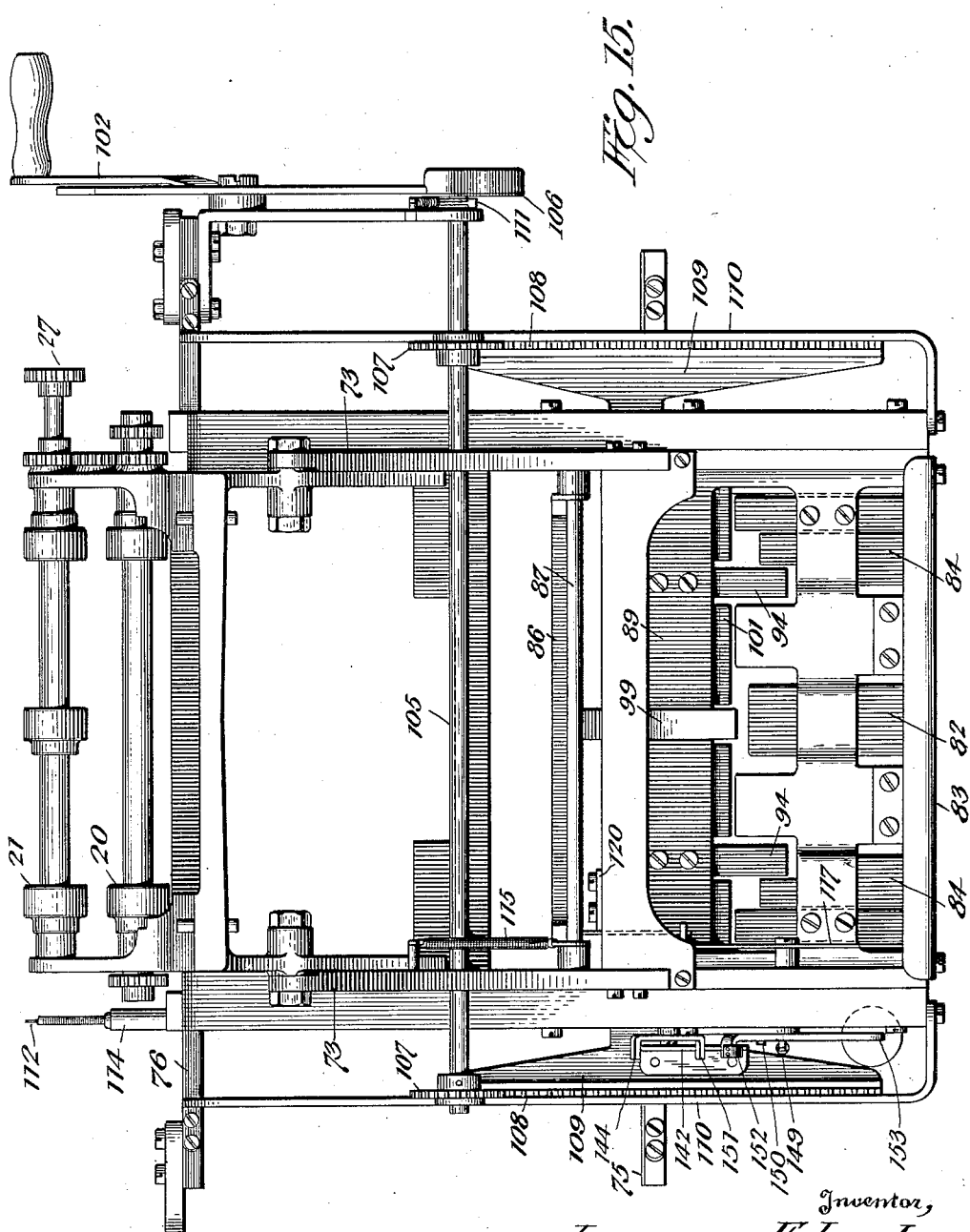
Inventor,
Laurence E. Lentz.
By
Attorney Jan. 12, 1932.                L. E. LENTZ                1,840,630
                    RECORDING AND CARD PUNCHING MACHINE
                    Filed March 25, 1927      29 Sheets-Sheet 16
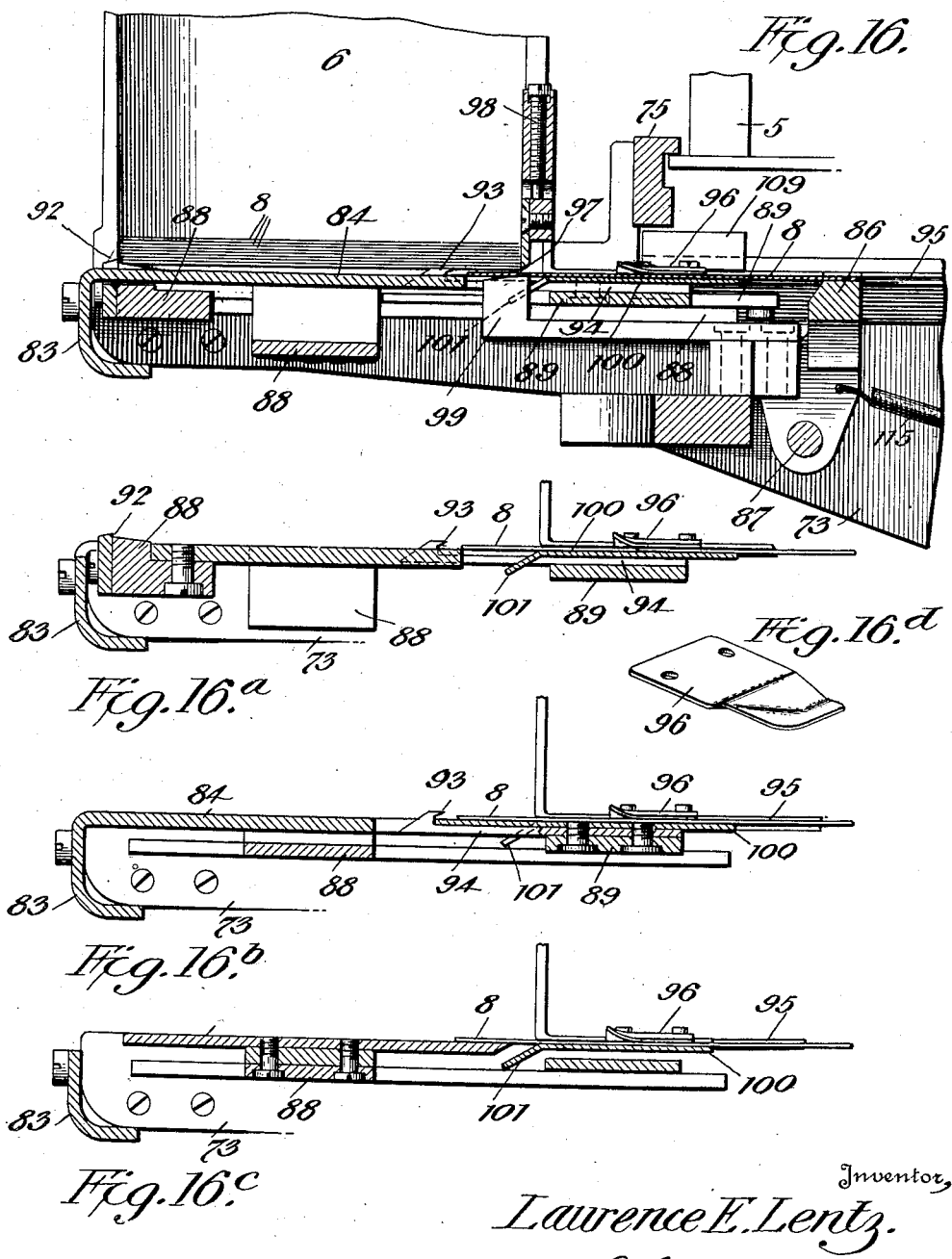
Inventor,
Laurence E. Lentz.
By
Attorney Jan. 12, 1932. L. E. LENTZ 1,840,630
RECORDING AND CARD PUNCHING MACHINE
Filed March 25, 1927 29 Sheets-Sheet 17
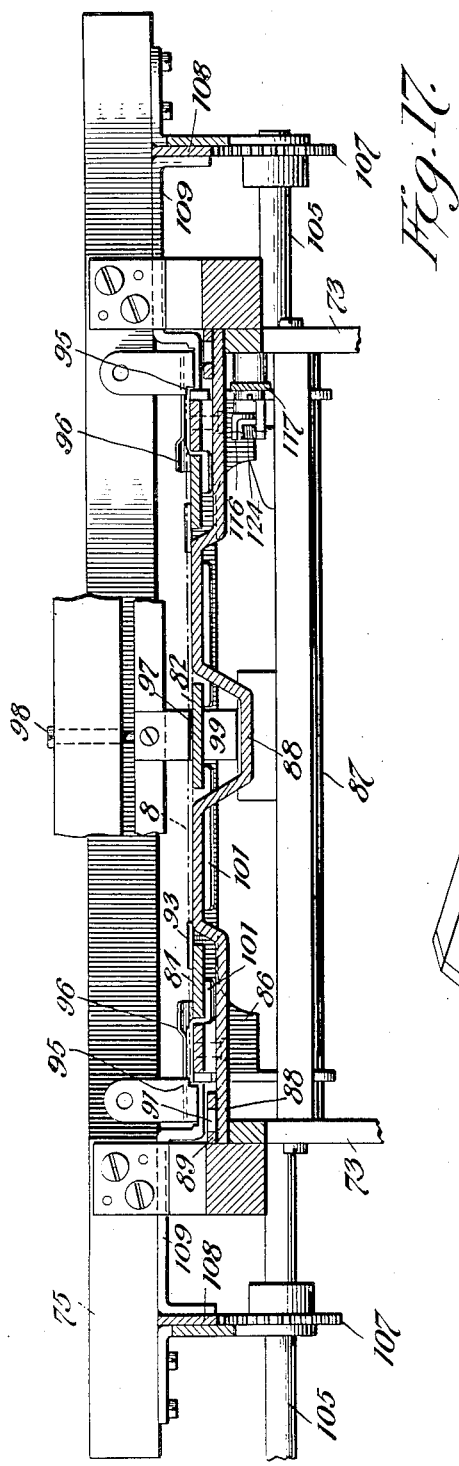
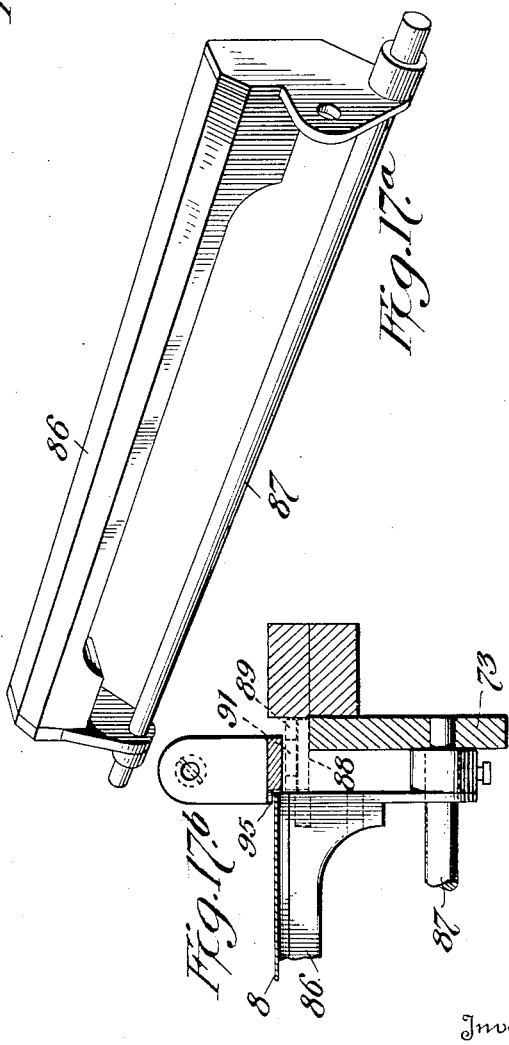
Inventor,
Laurence E. Lentz.
By
Attorney

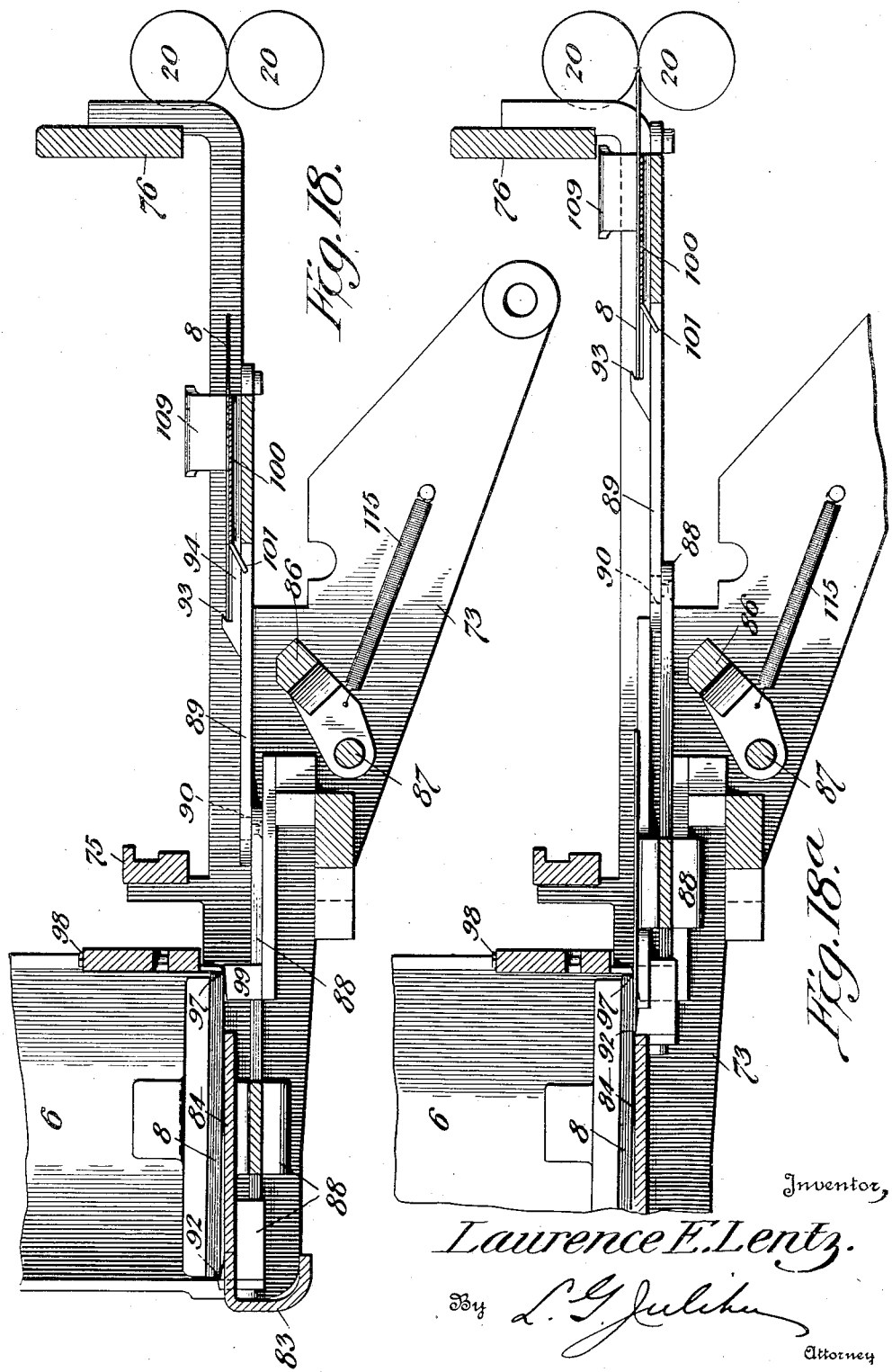

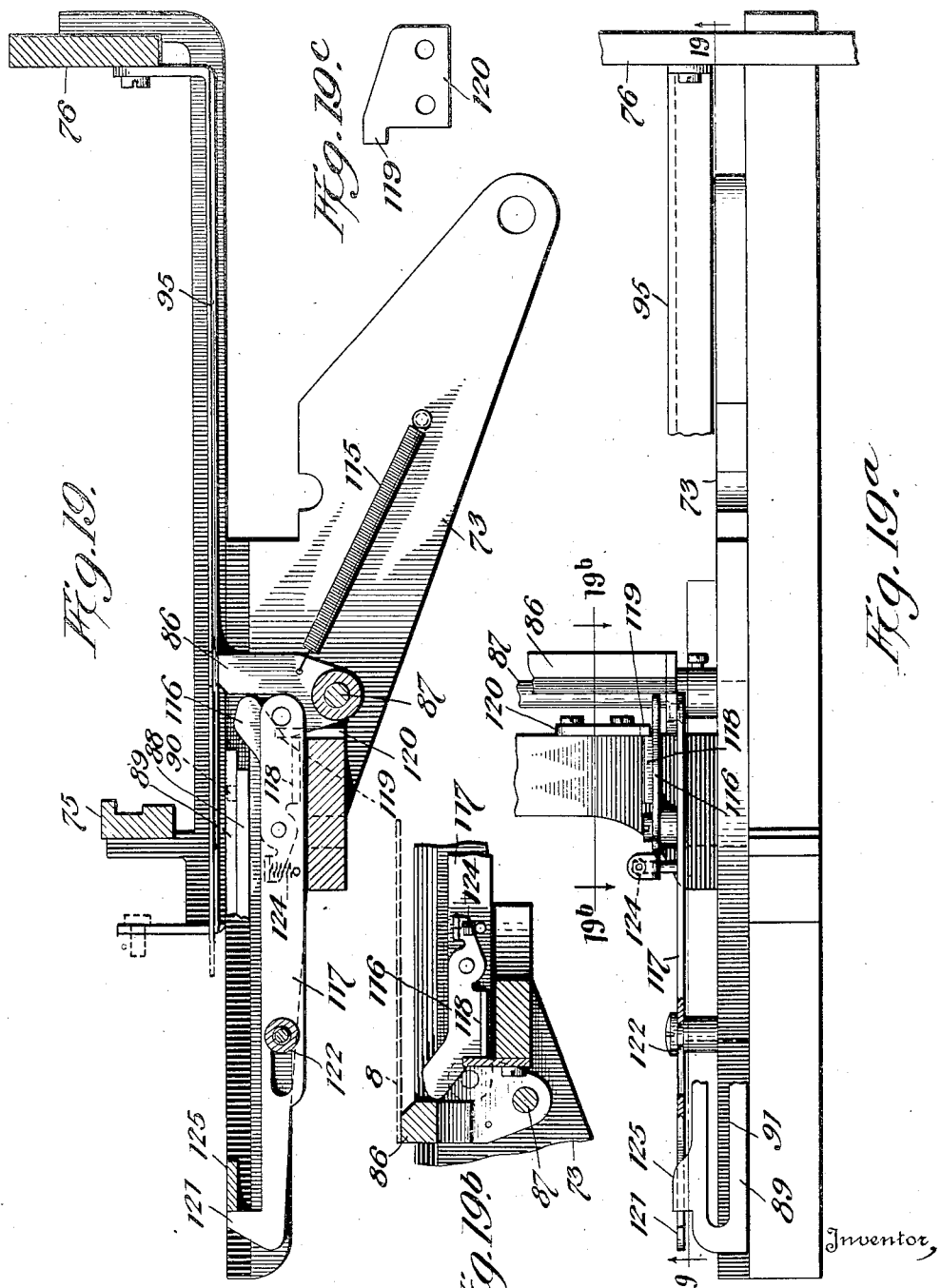

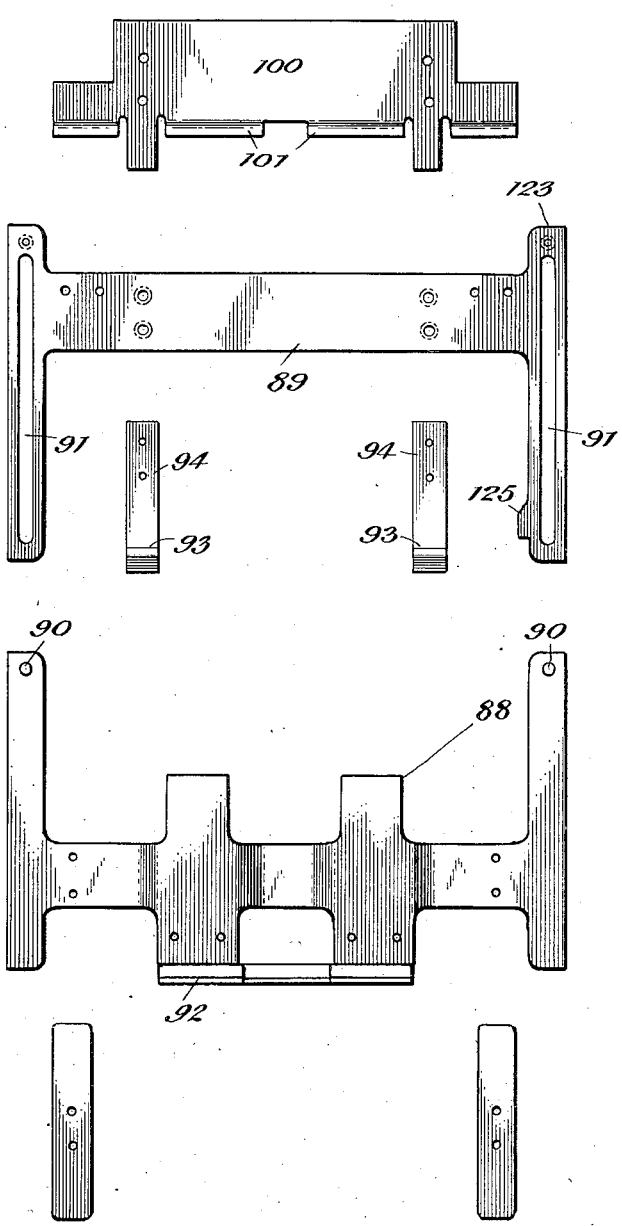

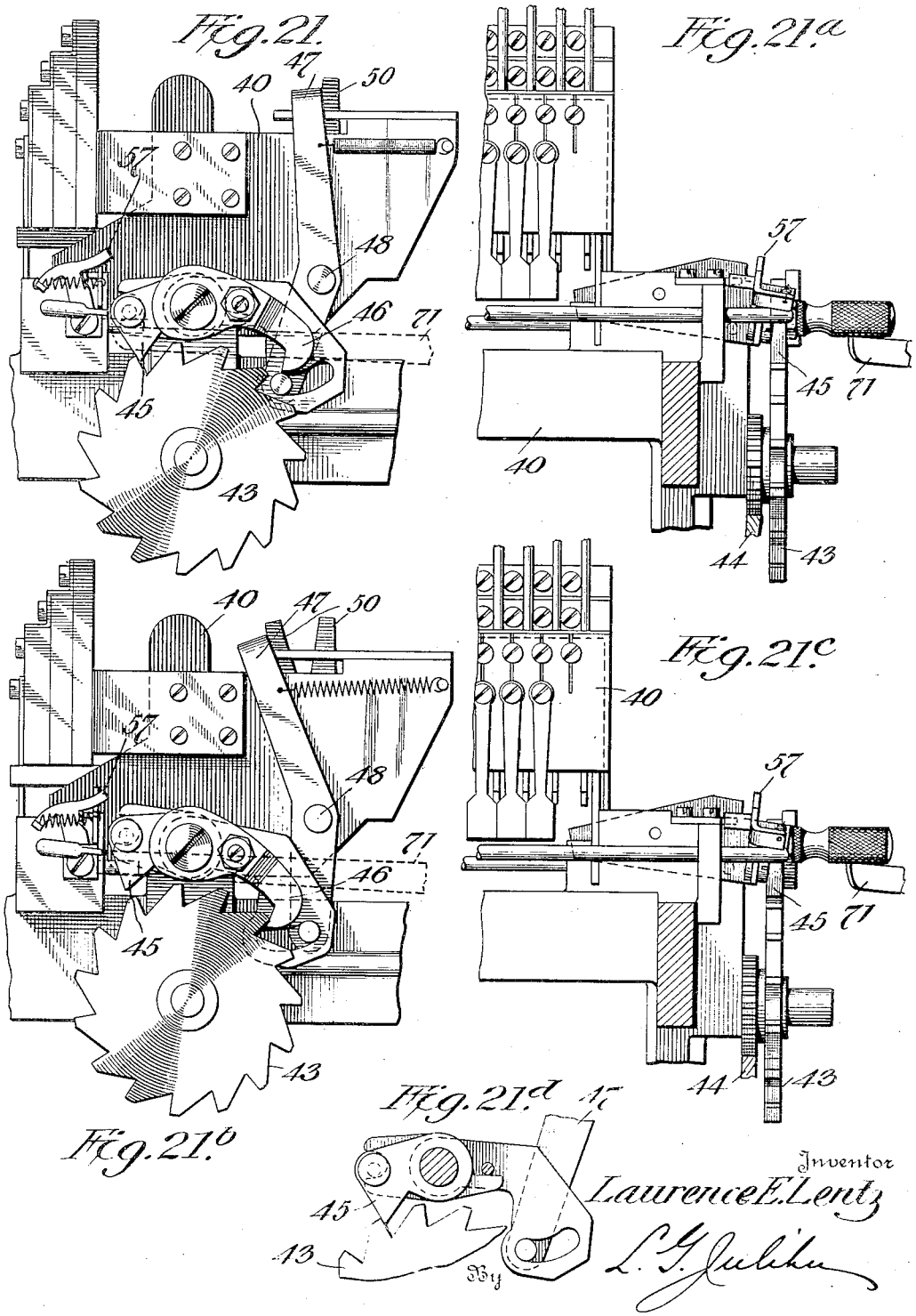

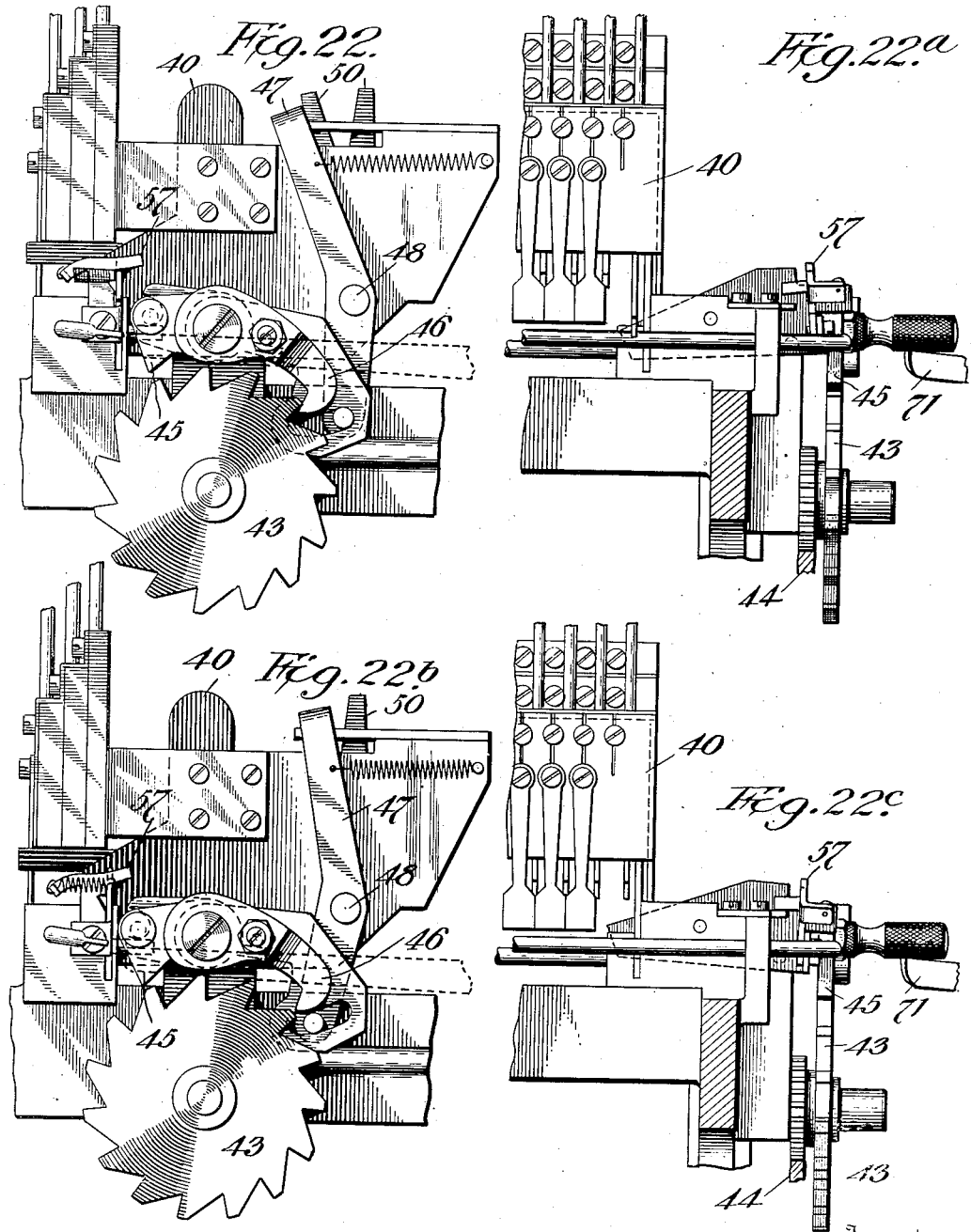

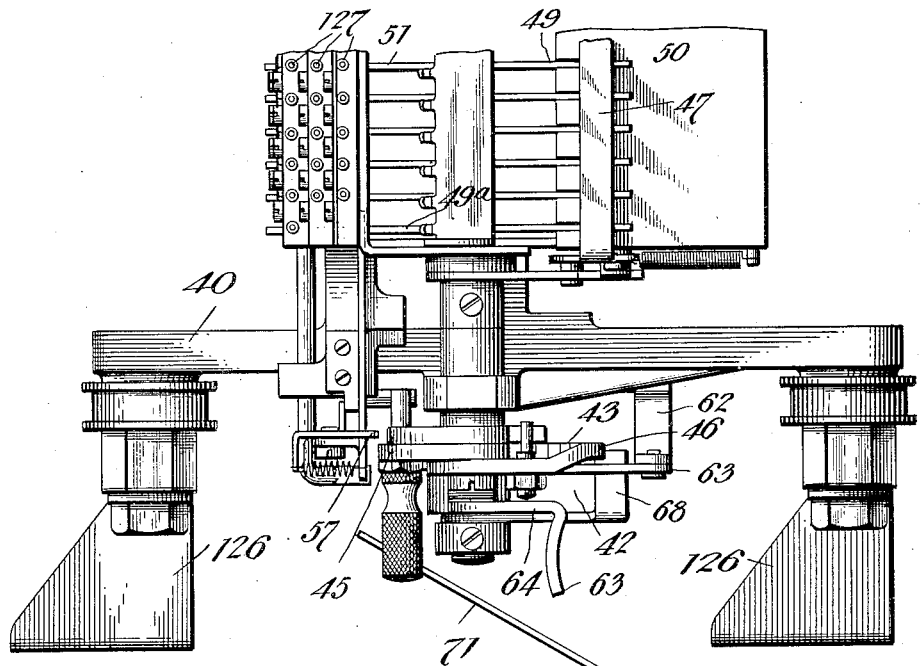
Fig.23.
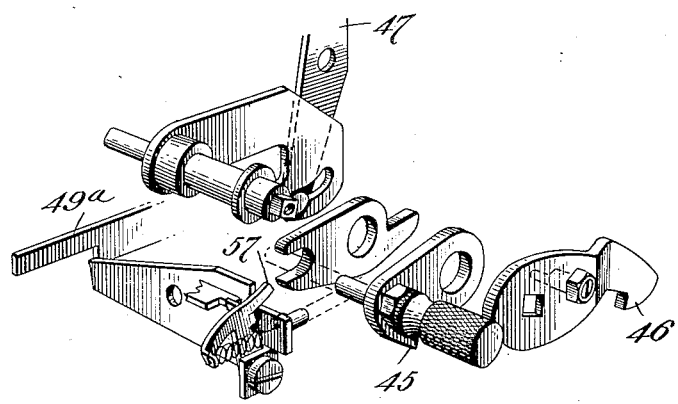
Fig.23.ª

Jan. 12, 1932.  L. E. LENTZ  1,840,630
RECORDING AND CARD PUNCHING MACHINE
Filed March 25, 1927   29 Sheets-Sheet 24
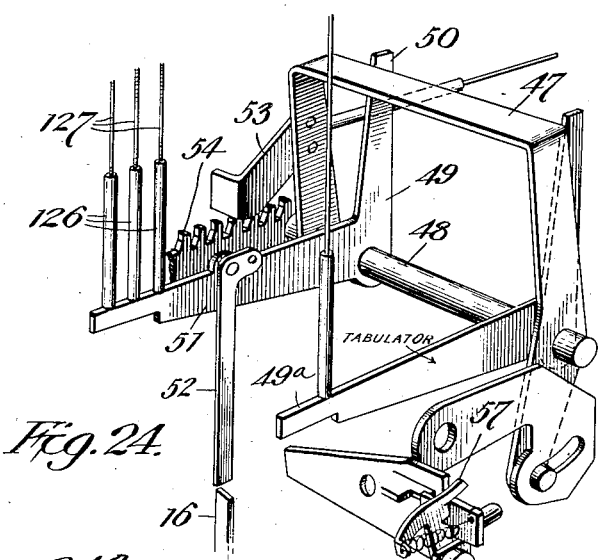
Fig. 24.
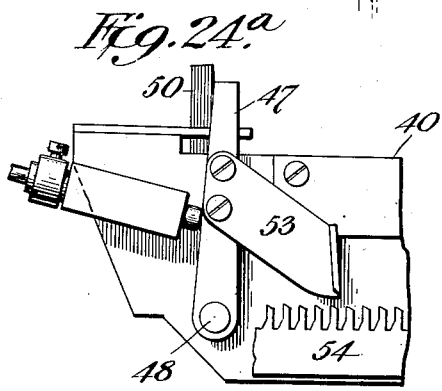
Fig. 24.ª
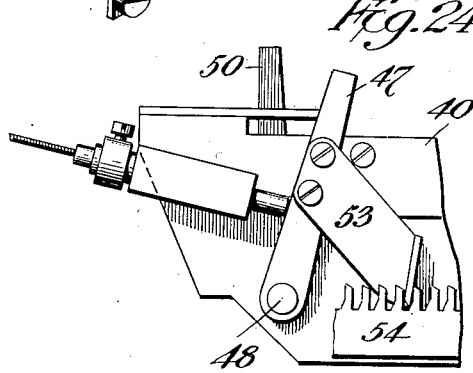
Fig. 24.ᵇ
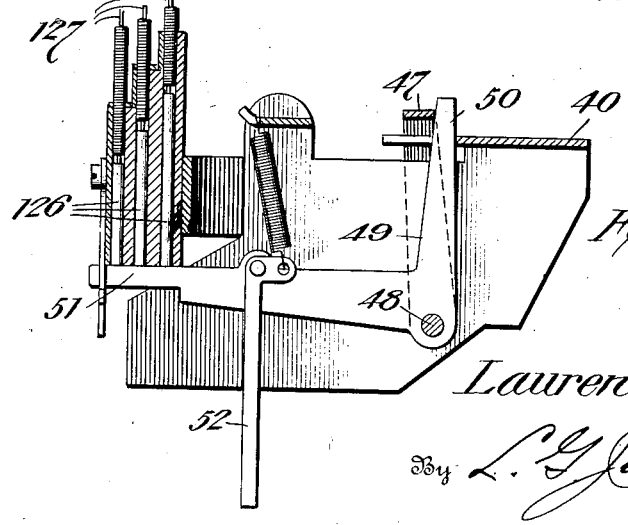
Fig. 24.ᶜ
Inventor,
Laurence E. Lentz.
By L. G. Julihn
Attorney

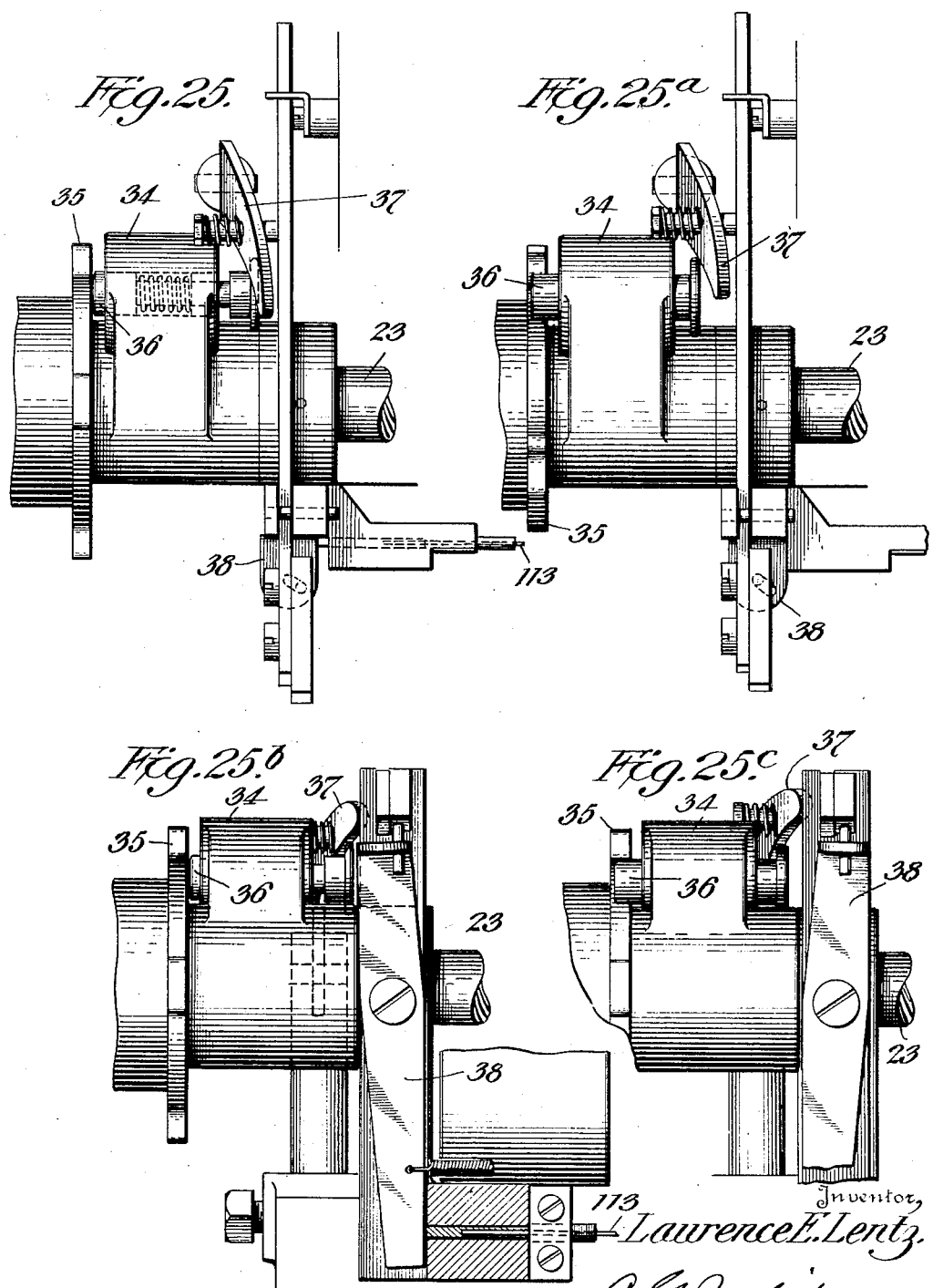

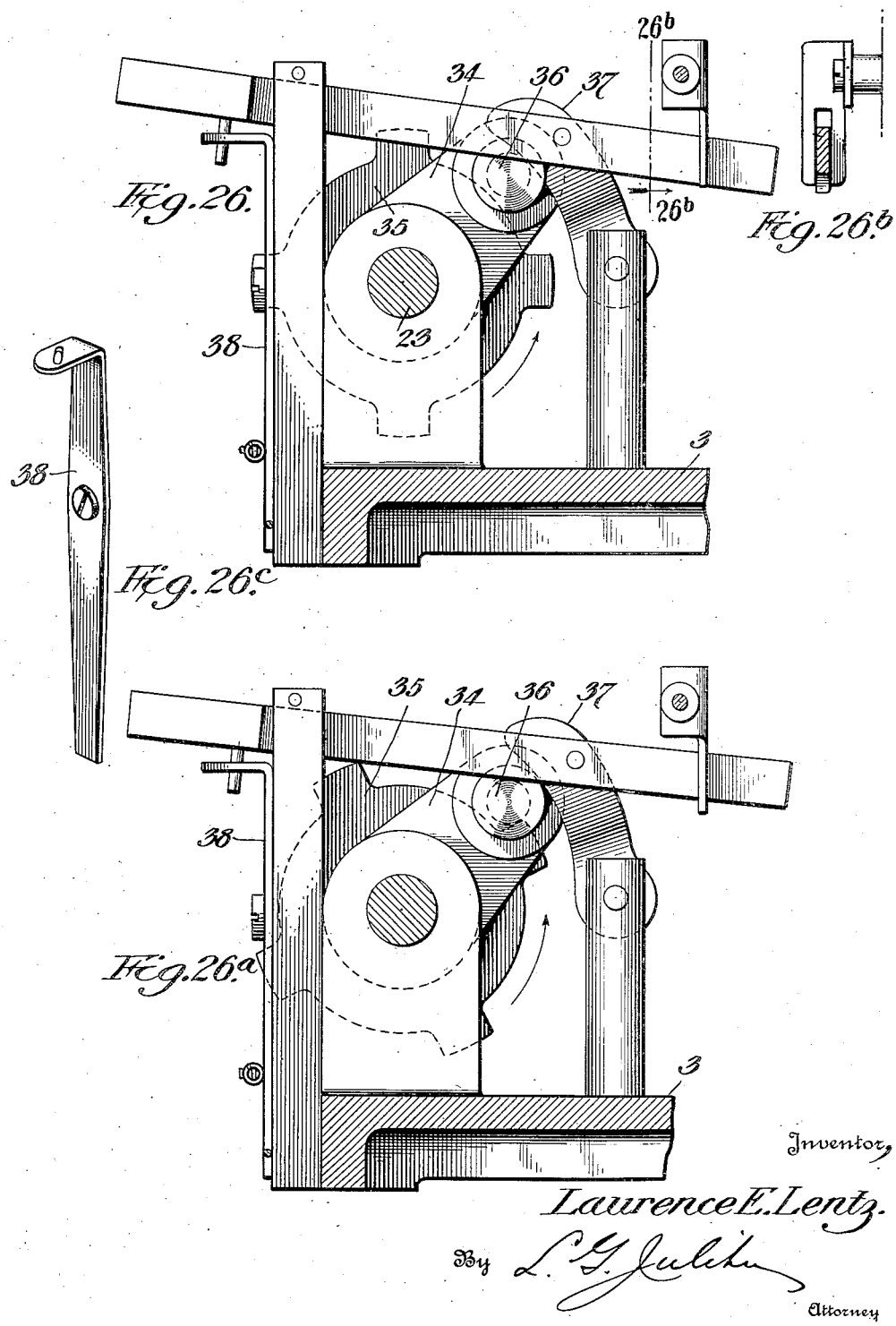

Jan. 12, 1932. L. E. LENTZ 1,840,630
RECORDING AND CARD PUNCHING MACHINE
Filed March 25, 1927 29 Sheets-Sheet 27
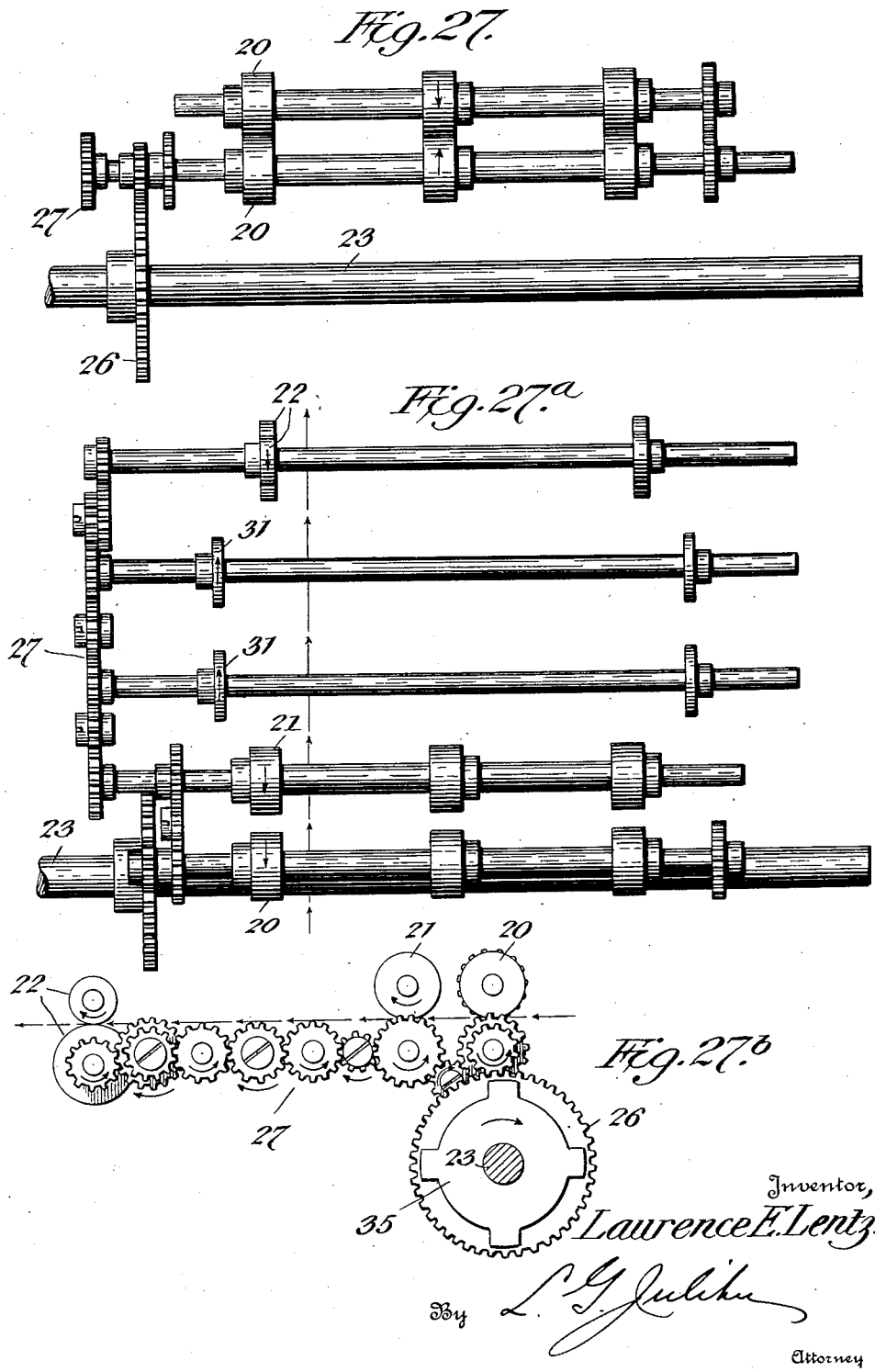

Jan. 12, 1932.  L. E. LENTZ  1,840,630
RECORDING AND CARD PUNCHING MACHINE
Filed March 25, 1927    29 Sheets-Sheet 28
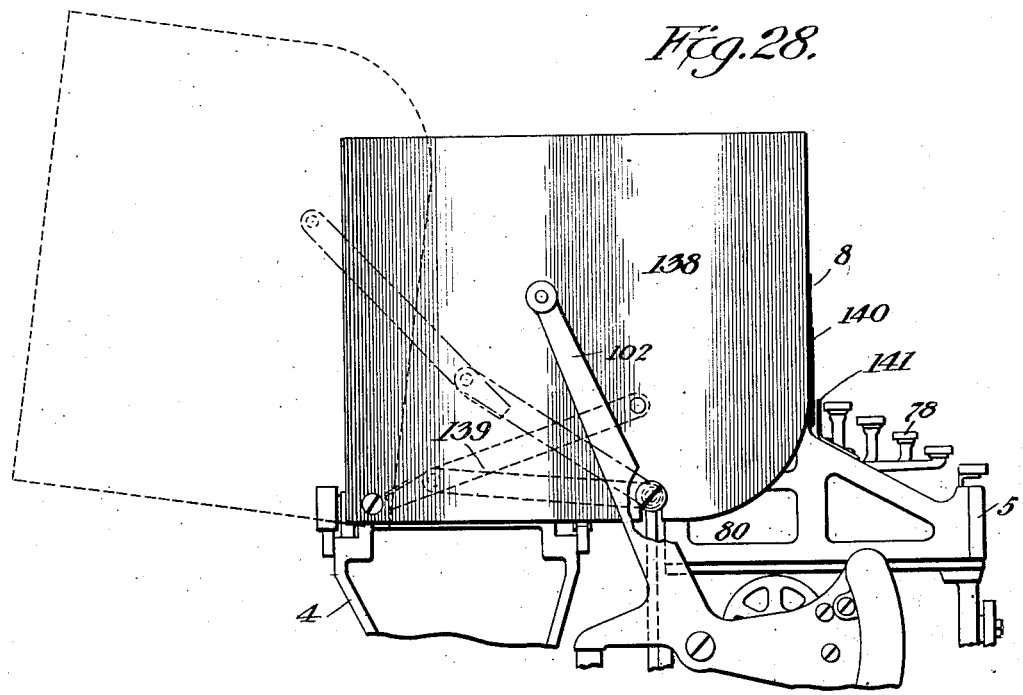
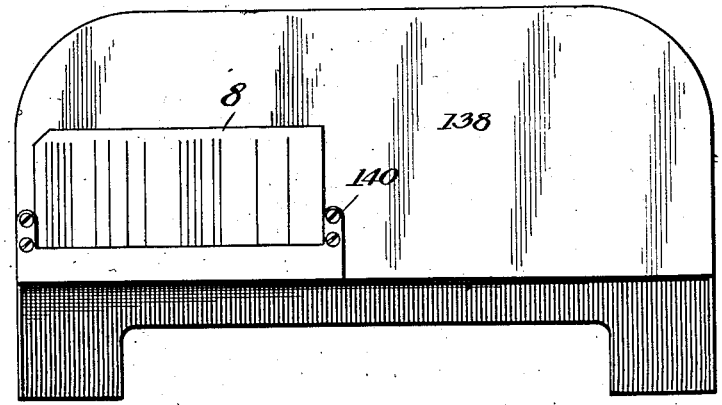
Inventor,
Laurence E. Lentz.
By
Attorney Jan. 12, 1932.  L. E. LENTZ  1,840,630
RECORDING AND CARD PUNCHING MACHINE
Filed March 25, 1927  29 Sheets-Sheet 29

Inventor,
Laurence E. Lentz.
By
Attorney

Patented Jan. 12, 1932

1,840,630

UNITED STATES PATENT OFFICE

LAWRENCE E. LENTZ, OF HARRISBURG, PENNSYLVANIA, ASSIGNOR TO THE ELLIOTT-FISHER COMPANY, OF HARRISBURG, PENNSYLVANIA, A CORPORATION OF DELAWARE

RECORDING AND CARD PUNCHING MACHINE

Application filed March 25, 1927. Serial No. 178,350.

This invention relates to a recording and card punching machine, combining for the printing and punching of a card, a typewriter of the travelling printing carriage or Elliott-Fisher type, and a card punch of the Powers type, which embodies a travelling punch setting carriage.

The object of the invention is to combine in a single machine structure, card printing and a card punching mechanism, both under the selective control of the same keys, and associated with card holding and feeding mechanism, arranged to deliver cards one at a time to the printing position, to receive a printed record, and then to the punching mechanism to be punched in a manner selectively determined by the operation of the keys incidental to the printing of the record on the card.

Another object is to combine with laterally stationary card handling and feeding mechanism, and a laterally stationary punching mechanism, a laterally movable structure embracing both printing mechanism and punch setting mechanism, so that letter space or column space selection, with respect to the card, will be simultaneously and correspondingly secured for both the printing mechanism and the punching mechanism.

A still further object of the invention is to provide between the keys and the punch setting mechanism, a series of operating connections which will result in the setting of a single punch or plurality of punches by the operation of single keys, so that when a key is operated to print a character, one or more punches, appropriately located to represent the printed character in accordance with a predetermined code, will be selected and set for the subsequent punching of the card in accordance with the characters printed.

Other objects of the invention will hereinafter more fully appear, as the following description of a preferred embodiment of the invention is developed.

In the accompanying drawings:

Figure 1 is a plan view of the machine.
Figure 2 is a front elevation thereof.
Figure 3 is a side elevation.
Figure 3a is a sectional elevation of the line spacing mechanism.
Figure 3b is a section on the line 3b—3b of Figure 3a.
Figure 4 is a rear elevation of the machine.
Figure 5 is an elevation of the side of the machine opposite to that shown in Figure 3.
Figure 5a is a detail view of the card feeding sector, and associated parts.
Figure 5b is a detail section on the line 5b—5b of Figure 5a.
Figure 6 is a front elevation of the card punching unit with the two pairs of primary feed rolls and their supporting frame omitted.
Figure 7 is a section through the printing unit on the line 7—7 of Figure 1.
Figure 7a is a detail section of the line space plunger guide associated with the printing unit.
Figure 8 is a vertical section through the card punching unit showing the rear portion of the printing unit in sectional elevation.
Figure 9 is a plan view of the keyboard and of wire operating levers associated therewith.
Figure 10 is a diagrammatic lay-out of the keyboard and its wire connections with the punch setting devices.
Figures 11, 11a, 11b, 11c, 11d, 11e, and 11f, are each a detail group of one of the wire operating levers.
Figure 12 is a plan view of the card feeding mechanism associated with the printing unit.
Figure 12a is an edge view of one of the shuttle brackets.
Figure 12b is a plan view thereof.
Figure 13 is a plan view similar to Figure 12, but showing the card advanced beyond the printing position in transit to the punching unit.
Figure 13a is a plan view of the card table.
Figure 13b is an edge view thereof.
Figure 14 is a plan view similar to Figures 12 and 13, with the shuttle moved all the way back to deliver a card to the punching unit and indicating in dot-and-dash lines the positions of 3 cards, the first resting on the card table within the feed hopper, the second being in the printing position, and the 3d being in position to be caught by the feed rolls of the punching unit.

Figure 14a is a detail perspective view of the gate-block and its mounting.

Figure 15 is a bottom plan view of the front or printing portion of the machine, showing the card supporting and feeding mechanism, back to and including the few rolls of the punching unit, all parts being at the extreme forward limit of their movement.

Figure 16 is a vertical longitudinal section on the line 16—16 of Figure 12, with the parts operated to present a card in position for printing.

Figure 16a is a section on the line 16a—16a of Figure 12.

Figure 16b is a section on the line 16b—16b of Figure 12.

Figure 16c is a section on the line 16c—16c of Figure 12.

Figure 16d is a detail section of one of the card depresser plates.

Figure 17 is a transverse section on the line 17—17 of Figure 12, on a somewhat enlarged scale.

Figure 17a is a detail perspective view of the platen.

Figure 17b is a view of one end of the platen and associated parts.

Figure 18 is a longitudinal section showing the platen swung down to avoid interference with the card feeding shuttle, the rear shuttle section being in position to pick up the front shuttle section.

Figure 18a is a similar view with the double shuttle completely operated to feed one card to the punching unit, and to feed the next card into printing position.

Figure 19 is a sectional view through the platen, and showing the platen controlling means.

Figure 19a is a plan view of the same.

Figure 19b is a reverse section of a portion of the structure shown in Figure 19, taken on the line 19b—19b of Fig. 19a.

Figure 19c is a detail of the platen locking plate.

Figure 20 is a detail group of the elements of the double shuttle.

Figure 21 is an elevation of the escapement for the punch setting mechanism.

Figure 21a is a view at right angles to Figure 21.

Figure 21b and Figure 21c are views similar to Figures 21 and 21a, but with the escapement operated.

Figure 21d is a detail of the escapement.

Figure 22 shows the escapement operated for release.

Figure 22a is a view at right angles to Figure 22.

Figure 22b is a view similar to Figure 22, after the return of the release key.

Figure 22c is a view at right angles to Figure 22b.

Figure 23 is a plan view of a portion of the punch selecting carriage, with a tabulating lever extended from the printing unit to release the escapement. This view also shows the mode of connection between the printing and punch selecting sections of the carriage.

Figure 23a is a detail group of the escapement mechanism.

Figure 24 is a perspective view of a portion of the group of punch setting levers and associated parts, including the universal bail and let-off dog.

Figure 24a is a detail elevation of the universal bail and let-off dog.

Figure 24b is a similar view, with the dog in an engaging position.

Figure 24c is a detail sectional elevation, showing the manner in which the Bowdin wires are mounted to operate a punch setting lever.

Figure 1:
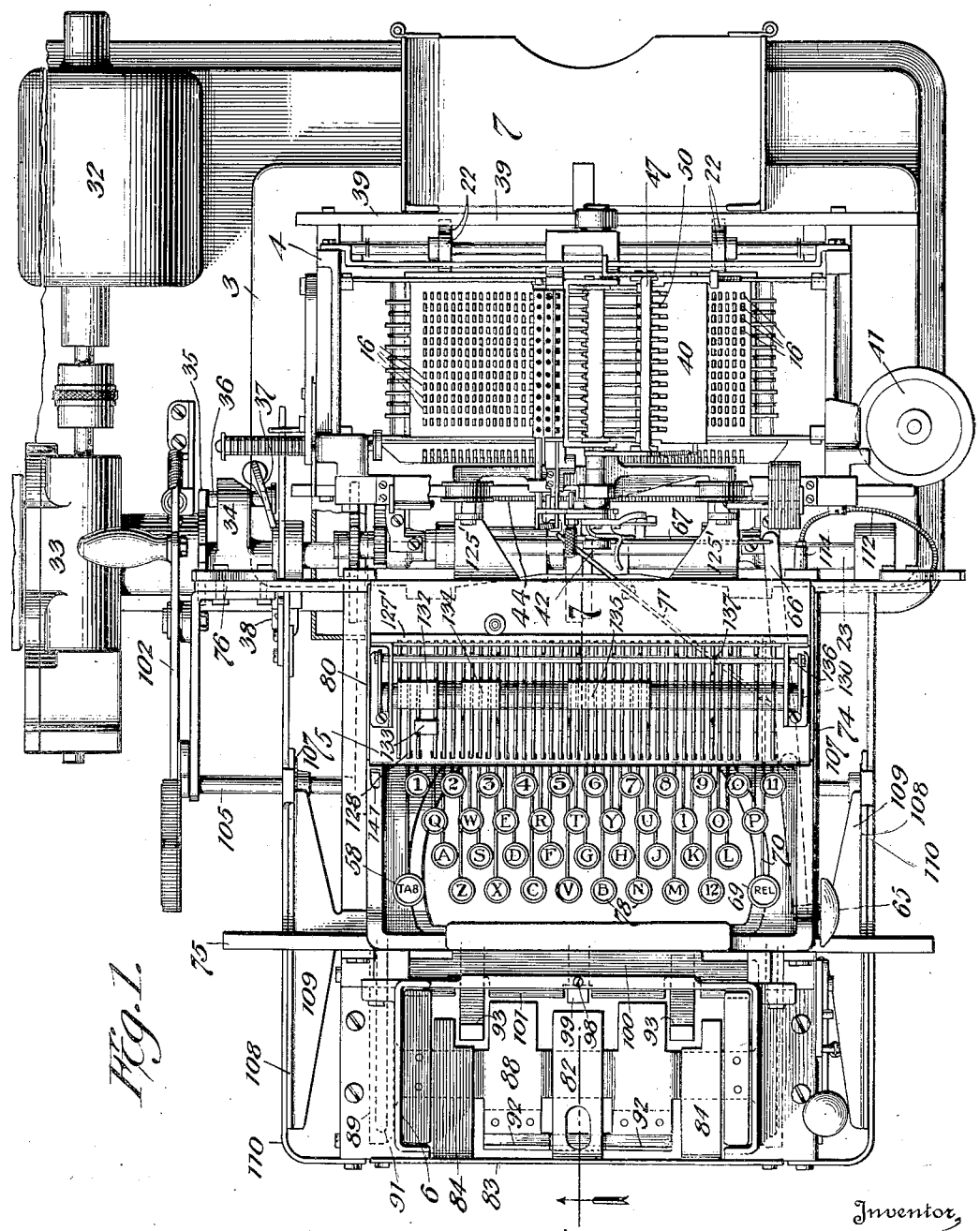
Figure 2:
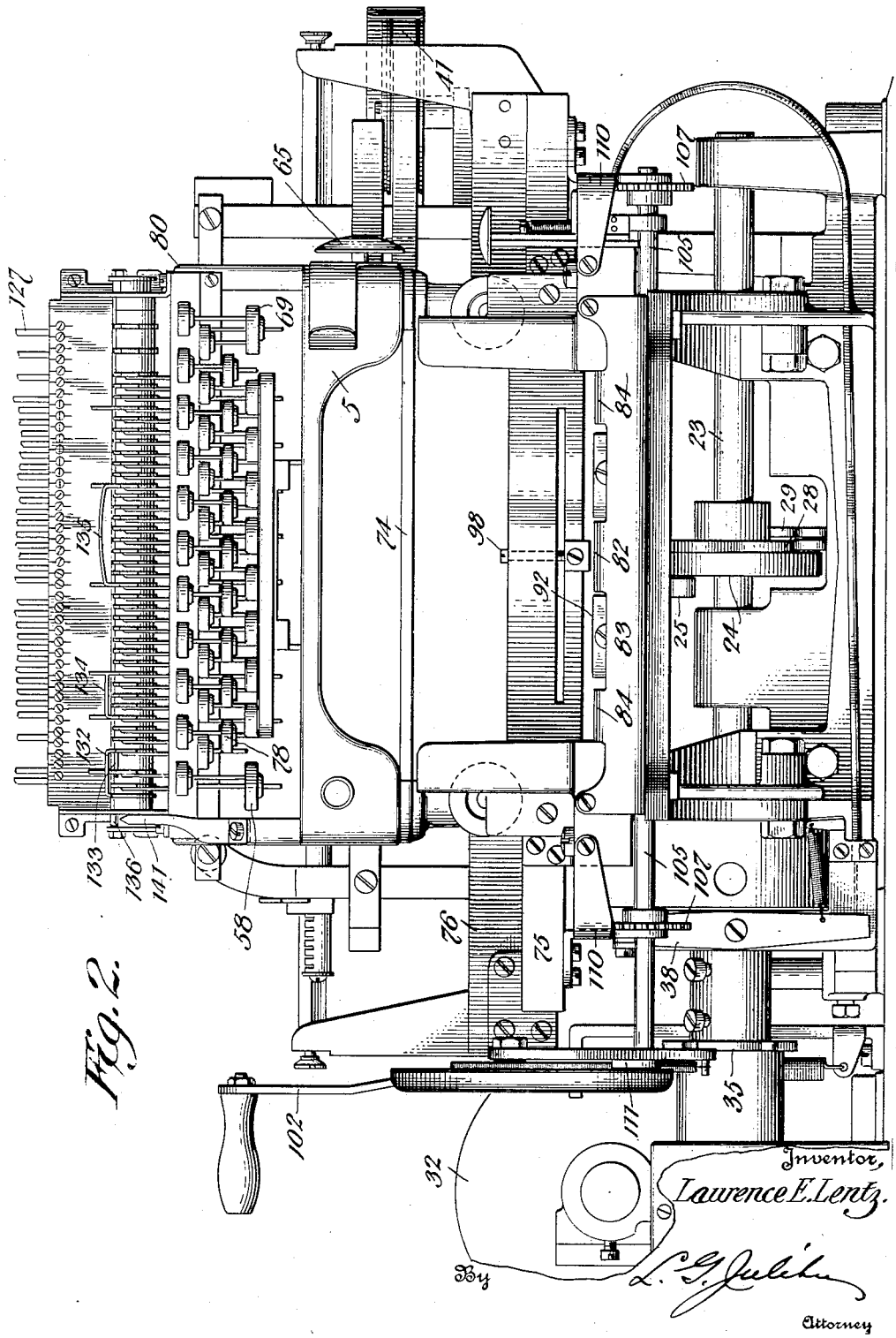

Figures 25, 25a, 25b, and 25c, are views of the motor group assembly of the punching unit.

Figures 26 and 26a are sectional elevations of the intermittent drive for the feeding and punching mechanism of the punching unit.

Figure 26b is a detail of the operating arm mounting.

Figure 26c is a detail view of an operating lever.

Figure 27 is a front elevation of the feed rolls and operating gear train.

Figure 27a is a plan view thereof, and Figure 27b is a side elevation of the same subject matter.

Figure 28 is a side elevation of a portion of the machine, showing the case.

Figure 28a is a front elevation of the case.

Figure 29:
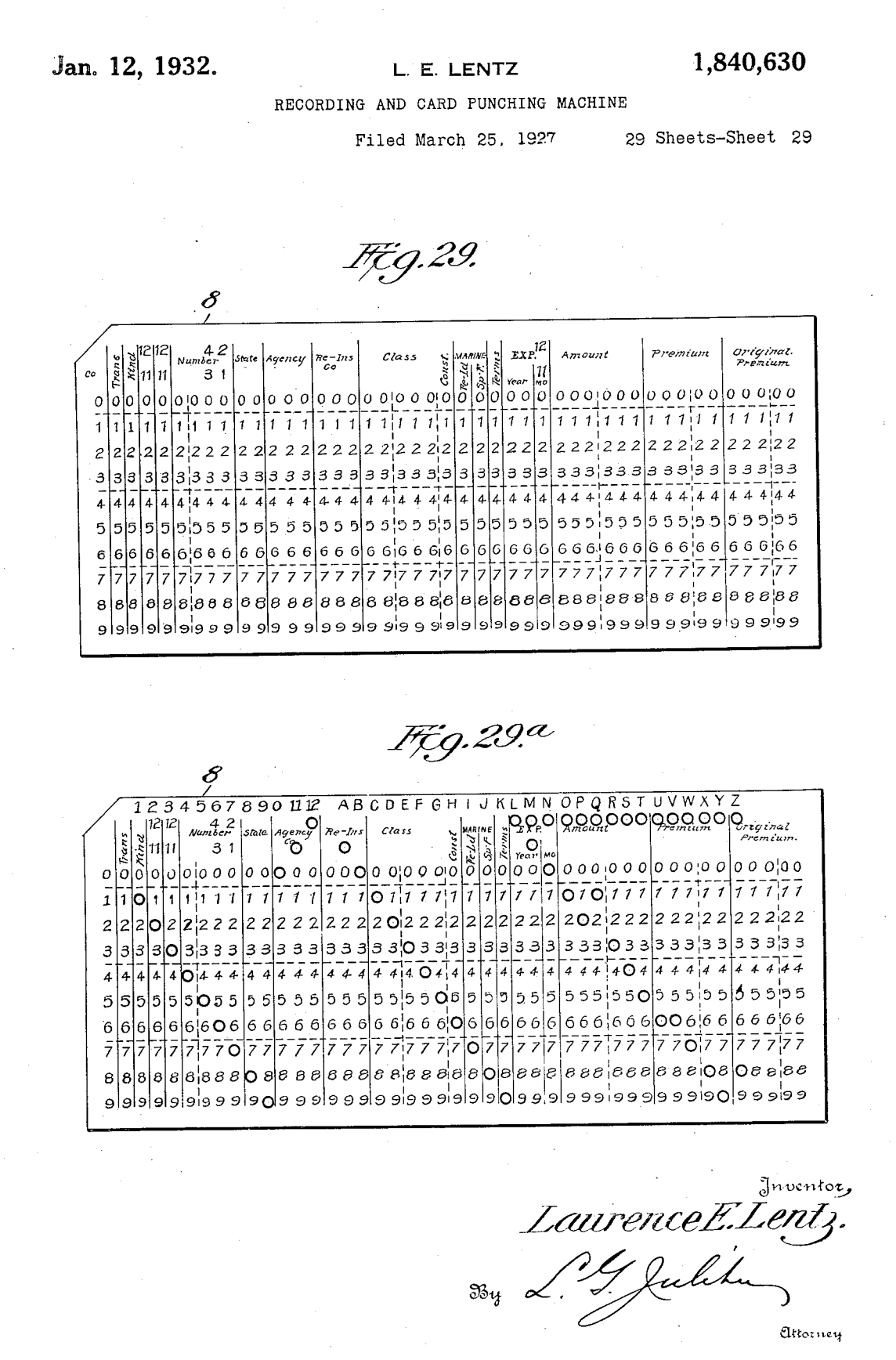

Figure 29 is a view of an unpunched tabulating card, and Figure 29a is a view of the same card after recording and punching.

Mounted on a suitable stand 1, is a base 2, from which rises a frame 3, on which is mounted a card punching unit 4, and a printing unit 5, disposed one in advance of the other, and interposed between a feed hopper 6 and a delivery hopper 7. The cards 8, which are the usual cards employed in tabulating machines, are held throughout their passage through the machine in horizontal position.

The cards are stacked in the front or feed hopper 6, and pass rearwardly, first to a printing position under the printing unit 5, where one or two lines of data are printed or recorded thereon, and are then advanced to the punching unit to be perforated in correspondence with a part or all of the printed data, before being finally deposited in the delivery hopper 7.

Figure 8:
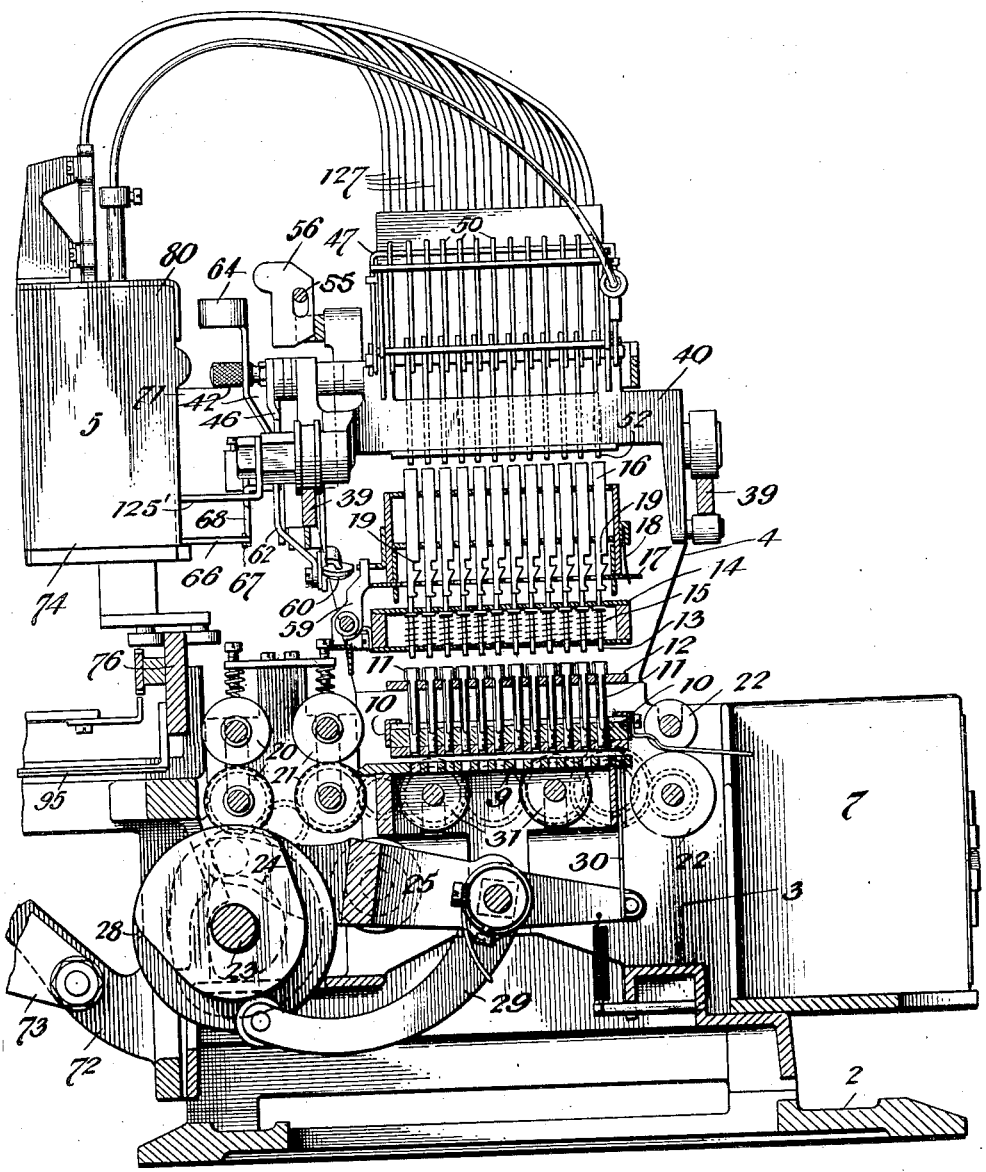

Proceeding first with a general description of the punching unit, the perforated die plate 9 is disposed below a punch plate 10, and receives the lower ends of a gang of punches 11, disposed opposite openings in the die plate, and headed above a stationary guide plate 12, as shown in Figure 8. The die plate 9 and punch plate 10 are movable vertically to present an interposed card to the lower ends of the punches 11, to be perforated by the latter, provided any of said punches, selected in a manner to be described, are held against upward movement, and thus caused to perforate the ascending card.

Mounted above the gang of punches, is a gang of setting pins 13, adapted to vertically reciprocate in a pin frame 14, against the resistance of individual springs 15, which serve normally to hold the setting pins sufficiently elevated to permit the punches to rise upwardly with the card as the latter is elevated by the die plate 9.

Suitably mounted above the setting pins are vertically movable setting bars 16, which rest upon the setting pins 13, and are designed to depress and hold in depressed position the pins 13, to block the elevation of the plungers which have been selected to perforate the card. It will be understood that the punches, setting pins, and setting bars, are all arranged in corresponding rows of vertically aligned coacting elements. It is therefore possible to employ in connection with each row of setting bars, a single latch bar 17, urged by a spring 18 in a proper direction to engage a notch 19 in any setting bar that has been depressed sufficiently to bring its notch in the plane of the latch bar. Obviously this latching action is accompanied by such movement of the latch bar as would cause the release therefrom of any previously operated setting bar.

Deferring for the moment a description of the mechanism whereby selected punches are set by the depression of their setting bars, attention is directed to the means for for feeding the card to and from the die plate or table 9. This feeding means includes in advance of the table two pairs of feed rolls 20 and 21, which serve to feed the card rearwardly to the table 9, from which after punching it is withdrawn by a pair of feed rolls 22, interposed between the rear side of the die table and the delivery hopper 7. Obviously to secure the proper sequence of operation, the feed rolls must be first operated to feed the card to a position below the punches, the die table must then be raised to cause the perforation of the card by punches previously selected and set, and the feeding mechanism must then operate to remove the punched card from the table and deposit it in the delivery hopper.

To this end a main drive shaft 23, mounted below the feed rolls 20, is provided with a table elevating cam 24 coacting with a table elevating lever 25, and a driving gear 26, geared to the shafts of the lower feed rolls through a gear train 27, as shown in Figures 27a and 27b. Shaft 23 is also provided with a gate operating cam 28, coacting with a gate lever 29, which operates a vertical card gate 30, located at the delivery side of the die table. By means of these cams and gears, the card is fed to the table, is arrested by the gate in accurate position, is punched by the elevation of the table, and upon the lowering of the table and gate, is fed back to the delivery hopper. Preferably additional feed rolls 31, located in the vertical plane of the table 9, assist in the feeding of the card to and from its position on the table.

The power for operating the punch and the feed rolls, is derived from a continuously operating motor 32, operating the shaft 23 through an interposed reducing gear 33, and a clutch 34, including a driver 35, a reciprocating clutch pin 36, a cam 37, and a clutch controlling lever 38, arranged and operating to impart one complete rotation to the shaft 23, and then automatically disconnect the motor until the clutch controlling lever 38 is again operated (See Figures in the 25 and 26 groups).

Figure 6:
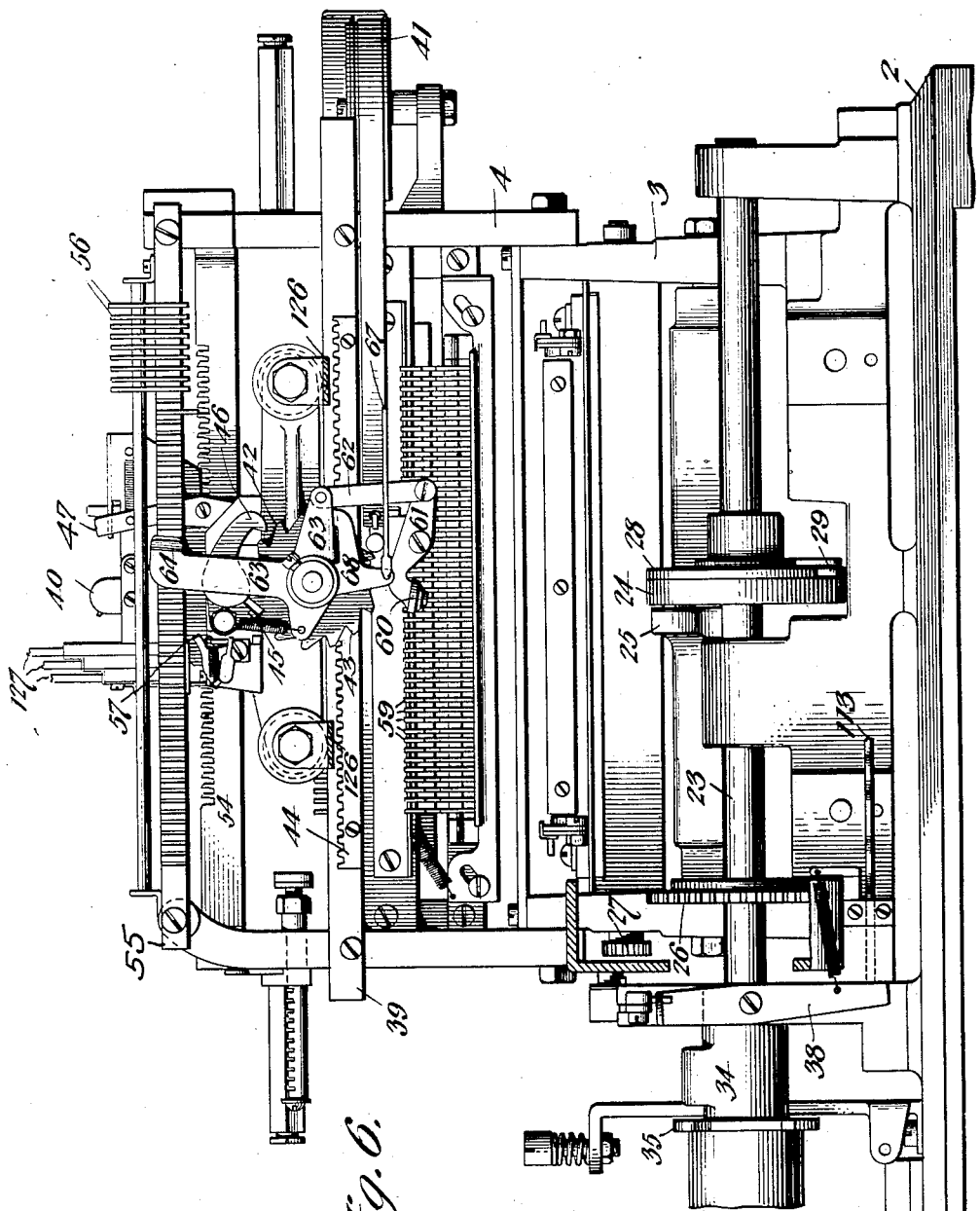

We have now seen how the punching unit of the machine is constructed and operates to feed a card into position on the die table to punch the card and to remove it. It is now in order to describe the means whereby the setting bars 16 are selected and actuated or set. Mounted to travel on elevated tracks 39, is a punch setting carriage 40, urged in one direction by a spring drum 41 (Fig. 1), controlled for step by step movement by an escapement 42 (Fig. 6), including an escapement wheel 43, geared to feed rack 44, and including escapement dogs 45 and 46, operated from a universal bail or bar 47 (see Figures 6, and the figures in the 21 and 22 groups). Loosely mounted on the shaft 48 of the universal bar, are a series of actuating or setting levers 49, of bell crank form, (Fig. 24) corresponding in number to a row of punches, and each having a vertical arm 50, disposed to actuate the bail 47, and a horizontal arm 51, from which depends a setting rod 52, disposed over one of the setting bars 16. Upon the actuation of a setting lever 49, or upon the simultaneous actuation of a plurality of these levers, one or more of the setting bars 16 in a particular row, determined by the position of the carriage, will be depressed and set, and upon the retraction of the setting levers the carriage will feed forward to the next row of punches. This feeding movement of the carriage is not left entirely to the control of the usual escapement heretofore described, but is guarded by a carriage lock 53, mounted on the bail 47, and movable therewith into and out of a toothed locking rack 54, which in the event of wear or misadjustment of the escapement, will compel accurate timing of the carriage feed.

A tabular bar 55 carries the usual tabulator stops 56, engaged by a movable tabulator stop 57, operated by tabulator key 58 to release the carriage and allow free movement thereof until arrested by one of the fixed tabulator stops, which by engagement with the stop 57, causes the latter to effect reengagement of the escapement dog to its normal holding position.

To restore the setting bars to normal setting position by the retraction of the carriage, and thus wipe out the previous setting of the punches, a series of restoring levers 59 are mounted at the front ends of the latch bars 17 in such relation to a restoring cam 60, movable with the carriage, that when the cam is in a depressed position, it will engage the restoring levers, and swing them to move the locking plates successively to their releasing positions as the carriage moves back to its normal position.

The cam 60 is mounted on a lever 61, connected by a link 62 to the lever 63 of a restoring key 64, by means of which the restoring cam may be set in position to wipe out or unset the punches. As the key 64 is immediately associated with the punching unit, however, it is desirable to associate this restoring means with the punch restoring key 65, associated with the keyboard at the front of the machine, and mounted on a lever 66, connected by a draw wire 67 with a bell crank 68, which when the key 65 is pushed horizontally in the direction of the carriage return, will operate the lever 63 to throw down the restoring cam 60 and cause the wiping out of the punch settings during the carriage retraction.

In like manner the release of the escapement associated with the punching unit is controlled from the keyboard by means of a release key 69, lever 70 of which operates a diagonally mounted lever 71, arranged to lift the holding dog 45 of the escapement out of the escapement wheel.

From the foregoing description, the construction and operation of the punching unit, which in general is well known, will be clearly understood. The front or printing unit of the machine, together with its card handling mechanism, will now be described and then it will be made clear how the interdependence of the two units is accomplished.

Between the side members 72 of the frame structure, which accommodate the front feed rolls of the punching unit, is secured a forwardly extending support 73, for the carriage section 74 of the card printing unit. This carriage or carriage section is mounted to travel on front and rear tracks 75 and 76, and has mounted thereon printing mechanism in the form of individually operative downstroke type bars 77, and printing keys 78 operating said bars through intermediate operating connections (see Fig. 7). These connections preferably include key levers 79, fulcrumed at the rear of the carriage case 80, and designed, when operated, to print on a card and to select the punches which will be subsequently effective to punch the printed card when the latter has been moved back from the printing unit to the punching unit.

In advance of the printing carriage, the support 73 carries what may be termed the feed hopper 6, in which the blank cards are stacked upon a card support 82, comprising a cross member 83 and three supporting plates 84, extended rearwardly therefrom. (See the Fig. 13 group.) From the hopper 6 the cards 88 are advanced one at a time from the bottom of the stack to the printing position, as shown in Figure 16, which presents the upper or rear margin of the card above a normally fixed platen 86, mounted, however, to swing downwardly from a platen shaft 87, for the purpose of withdrawing the platen from interfering relation with the card feeding mechanism, to be described.

The card feeding mechanism is in the form of a double shuttle, comprising two shuttle sections or slides 88 and 89, suitably guided in the sides of the support 73, and designed respectively to advance a card from the feed hopper 6 to the printing position, and from the printing position to the feed rolls of the punching unit. The front feed slide or shuttle 88, has pins 90, which engage elongated slots 91 in the rear slide or shuttle section 89. This connection permits the two slides to normally occupy the position indicated in Figure 12, with the pins located at the rear ends of the slots, and the shuttle sections occupying their extreme forward positions.

The front slide has a proper sectional configuration, (see Fig. 17) to present portions thereof in the plane of the card supporting plates 84, at points intermediate of said plates, and is equipped with card engaging hooks 92, which upon rearward movement of the shuttle engage the lowermost card in the hopper 6, and feed the card to the printing position. When in the printing position, as shown in Figure 16, the rear edge of the card will have moved slightly in rear of card engaging hooks 93 on the rear shuttle section 89, these hooks being located at the rear ends of fingers 94, which are accommodated by the configuration of the card support and the front slide.

Suitable card guides 95 are provided in the walls of the shuttle support, and in advance of the platen are mounted card depressers 96, which engage the opposite end portions of the advancing card, and insure its location in the proper plane when presented to the platen. To prevent the escape of more than a single card at a time from the hopper 6, the cards are compelled to pass a card gate 97, having a micrometer adjustment 98 with respect to a gate block 99, having a forwardly and downwardly inclined upper face to facilitate the guiding of the rear edge of the card below the gate.

Figure 7:
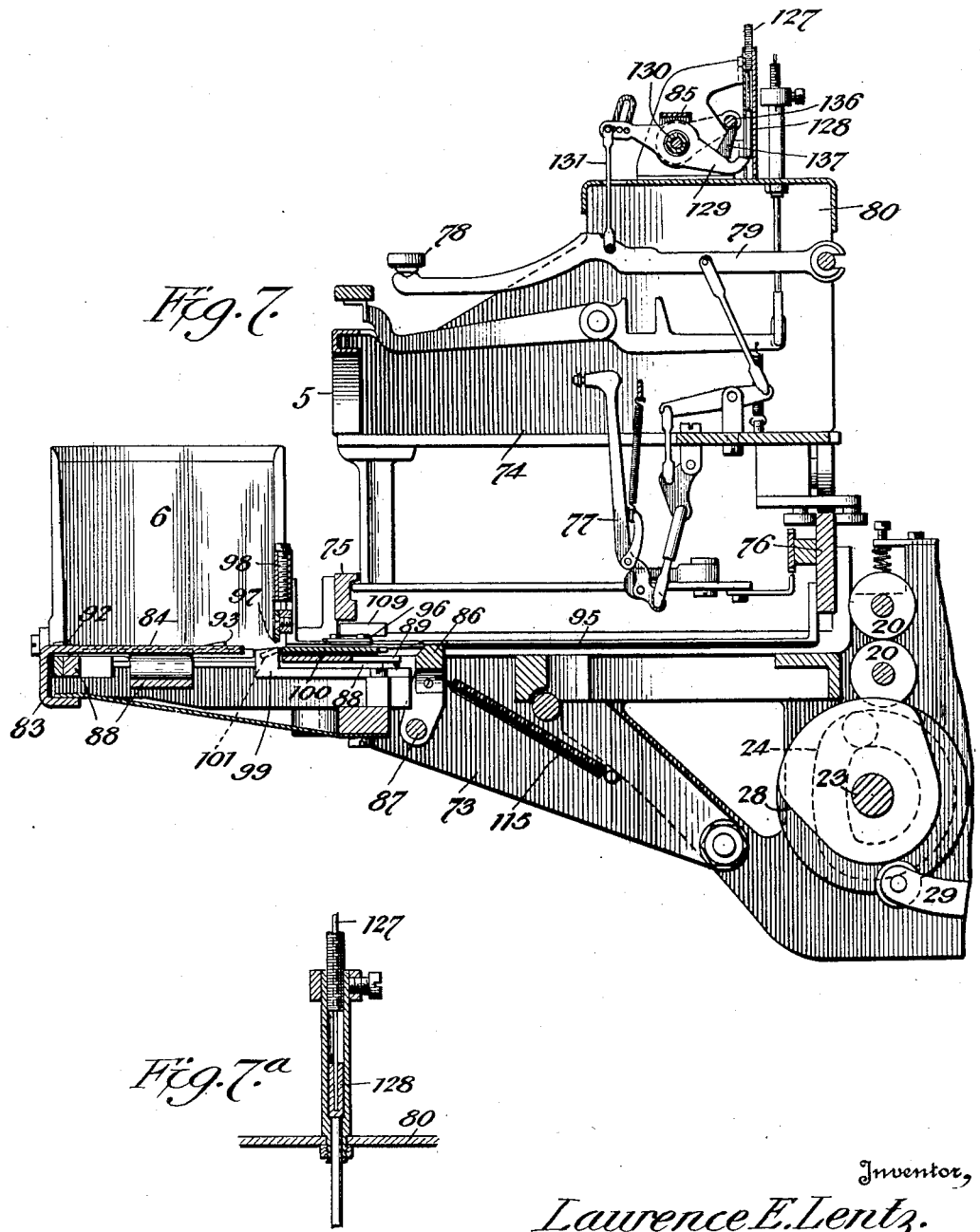
Figure 12:
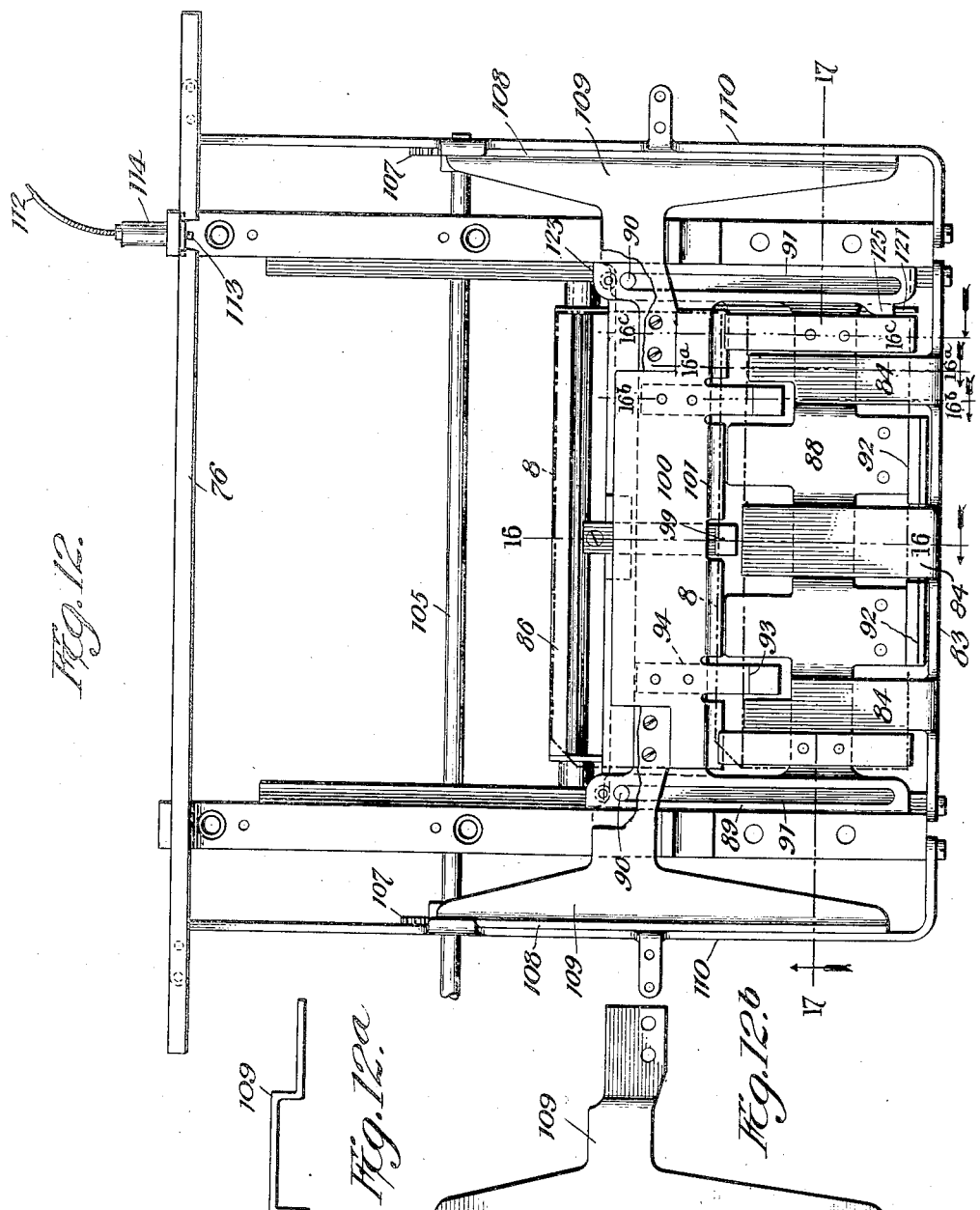

One or more card supports 100 may be located at convenient points in the travel of the card from the hopper 6 to the punching unit, one of such supports being preferably associated with the depressers 96, and preferably having a downwardly inclined front edge 101 to guide the advancing edge of the card to the plate. Assuming the shuttle sections to be occupying the normal positions, as shown in Figures 7, 16 and 12, the shuttle operation will begin with a rearward movement of the slide 89, the hooks 93 of which will engage the rear edge of the card which is in the printing position, and will advance it toward the punching unit. This independent movement of the slide 89 will continue until it reaches the position shown in Figure 13, at which time the front ends of the slots 91 will engage the pins 90, and continued movement of the rear shuttle section will cause like movement of the front shuttle section, which will engage a card and feed it to the printing position, while the previously printed card is being carried back to the feed rolls.

The positions of the parts at this time is shown in Figure 14, it being noted that one section of the shuttle has advanced a card to the printing position, while the other shuttle section has advanced a previously printed card to present its rear edge between the feed rolls of the punching unit. Upon the retraction of the shuttle, the rear section thereof will first move independently the distance permitted by the slots 91, and will then engage the pins 90 to return the front shuttle section, the card engaging hooks 92 passing under the stacked cards, and the hooks 93 passing under the card which has been moved to the printing position.

Figure 5:
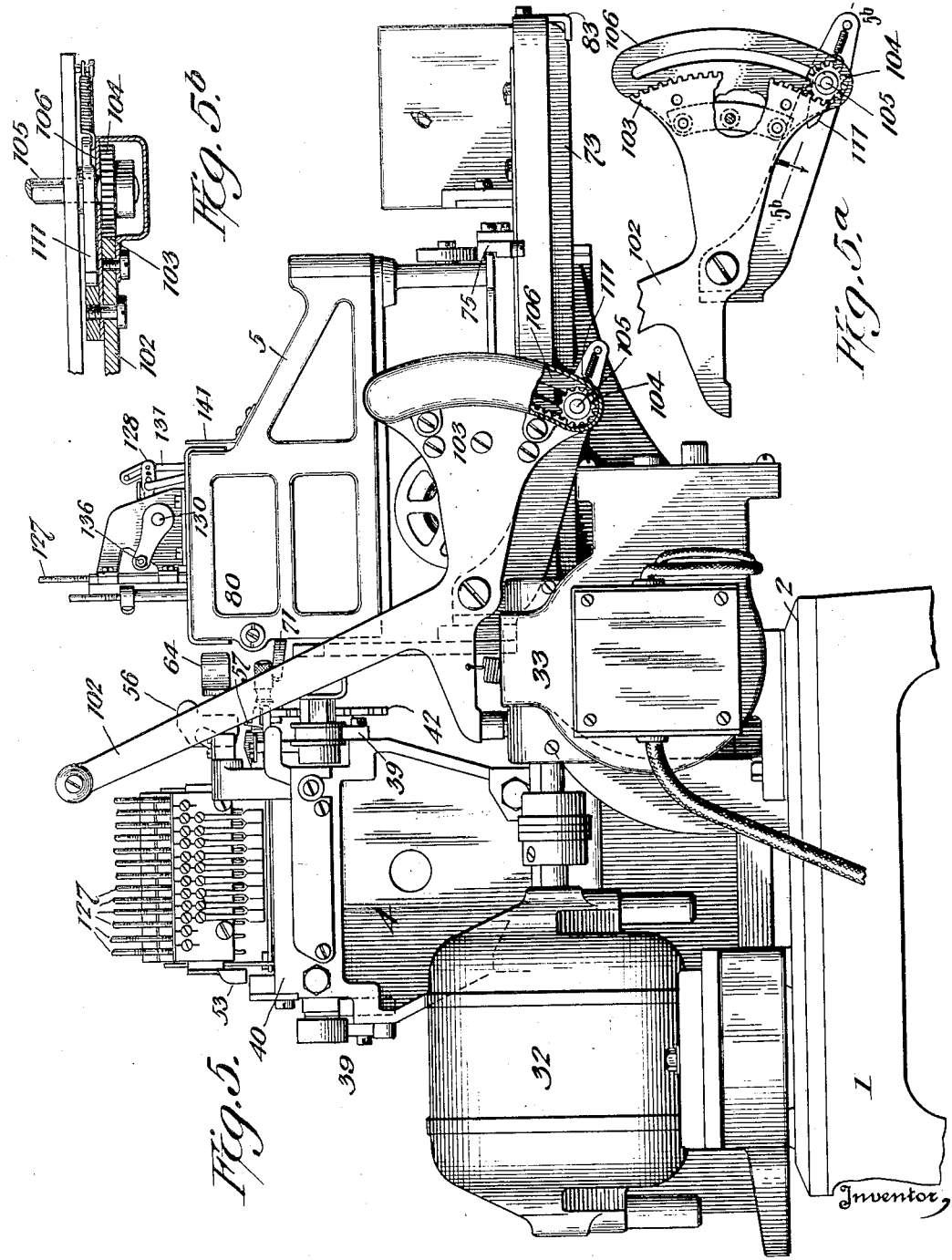

The means for operating the shuttle include a shuttle operating lever 102 provided with a toothed segment 103, engaging a pinion 104 on a shaft 105, accommodated in a curvilinear guide 106, formed at the end of the operating lever (see Fig. 5). Also mounted on the shaft 105 are pinions 107, (see Fig. 15) engaging racks 108, carried by brackets 109, extended from the rear shuttle section, and guided by guide rails 110, extended parallel with the outer sides of the support 73. When the operating handle 102 is drawn forward from the position shown in Figure 5 a full distance, determined by a full stroke device 111, a complete feeding operation of the shuttle will be effected, and upon the return of the lever the shuttle sections will resume their normal positions.

We have seen that while the motor is in continuous operation, the punching unit is not brought into action until the clutch controlling lever 38 is operated. It is therefore desirable to provide means whereby, when a card is advanced from the printing unit of the machine to the front feed rolls of the punching unit, said rolls will be started to feed the card to the punching table. One embodiment of such means is shown in Figure 12. A Bowdin wire 112 is arranged to operate the clutch controlling lever 38, and has one end 113 projected from the sleeve 114 into the path of movement of one of the shuttle brackets. Therefore, as a card is presented to the feed rolls, the clutch will be automatically operated, and the motor will immediately start the rolls, to take the card from the shuttle to the punching plate.

At a proper time in the operation of the shuttle, the platen 86 is swung down or depressed from its normal position, (see Fig. 19) to the depressed position, (Fig. 18), by a spring 115. Normally, however, this movement of the platen is prevented by a platen lock 116, pivoted on a platen bar 117, and having a ledge 118 engaging a projection 119 on a plate 120. The bar 117 which is pivotally connected at its front end to the platen, is provided at its rear end with a hook 121, and at a point intermediate of its ends, with suitable guiding means 122. The platen normally occupies the position shown in Figure 19, but during the rearward movement of the shuttle, part 123 thereof will engage the platen lock and depress the latter against the resistance of the spring 124, to carry the ledge 118 of the lock below the projection 119 on the fixed plate 120. As the plate no longer resists the pull of the spring 115, the latter will swing the platen down as shown in Figure 18, where it remains until the shuttle has moved back sufficiently to eliminate the possibility of interference between the platen and the shuttle. When the shuttle has nearly reached the limit of its retractive movement, a part 125 thereof will engage the hook 121 of the platen bar, and will draw the latter forwardly, restoring the platen to its operative position, where it is held as the platen lock swings into engagement with the locking plate 120.

We have now seen the general organization of the punching and printing units, and how the cards are taken one at a time from a stack and carried first to the printing unit for printing, and then to the punching unit for punching, in a continuous cycle of operations of the machine. It may now be stated that the printing and punching sections of the carriage are tied into a single travelling unit by rigid mechanical connections 125′, which places both the travelling printing mechanism and the travelling punch selecting or setting mechanism under a common control. In this way absolute uniformity and correspondence in the spacing movements of the printing mechanism and punch selecting mechanism is obtained. This is, of course, material, because as will be understood, the class of cards being operated upon are subdivided into a large number of vertical columns, which determine the significance of perforations located therein, and as the matter printed on the card is intended to afford a check on the accuracy of the card as punched, it is essential that the location on the card of both the printed symbol and the punched equivalent be absolutely accurate and in true correspondence.

The legends printed on the cards are expressed in letters and numbers, having a range of 38 characters, which must be capable of being printed on the cards, and which must also be capable of being symbolized by perforations in the cards. It must be remembered, however, that there are only 12 punches in each line, and it will be obvious, therefore, that the wide range of selection required to symbolize any character that can be printed, will necessitate the selection of individual punches to express, let us say, from 1 to 12, or from A to L, if letters or numbers can be differentiated by position on the card, and will also necessitate the simultaneous selection of a plurality of punches to symbolize each of the remaining characters. Thus it will be seen, by reference to the punched card in Figure 29a, that the numbers 1 to 12 are expressed by single punchings, according to their vertical location on the card, while the letters A to L are symbolized by single punchings vertically located as before, but having a horizontal location on the card which distinguishes them as letter symbols.

It will also be noted that the remaining letters of the alphabet, to wit M to Z, are expressed by a combination of punchings, necessitating the simultaneous use, and consequently the simultaneous selection of two punches in the same row. This is conveniently accomplished by combining the 12 punch with each of the other punches to secure an additional range of symbols with the exponent 12, so to speak, to distinguish them from similar symbols having no exponent. This general explanation of the end desired will facilitate the understanding of the description of the means employed to attain such end, and an examination of the diagrammatic showing of the connections between the keys and punch actuating or setting devices will greatly facilitate the explanation.

Figure 10:
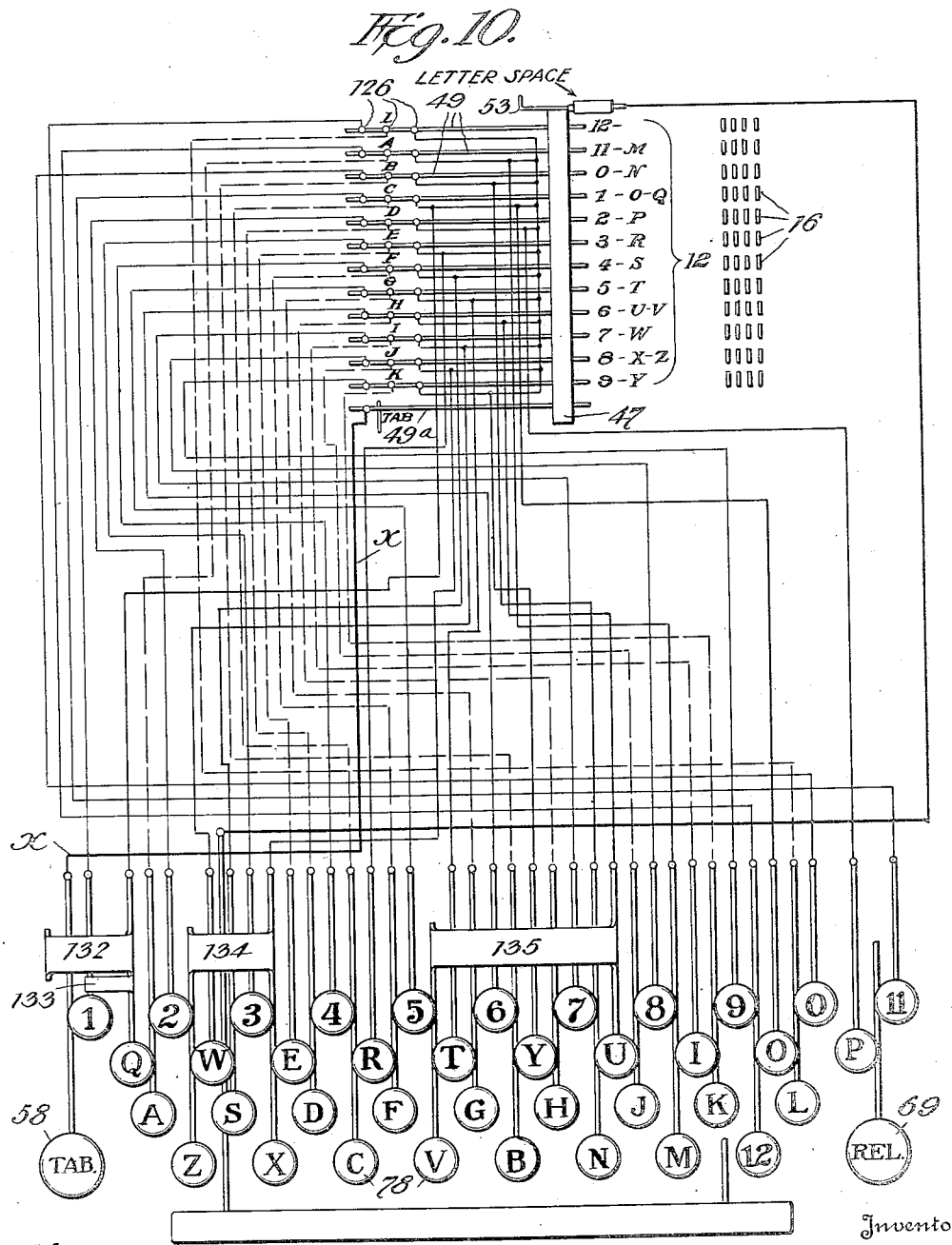

With each of the horizontal arms 51, of the setting lever 49 (see Fig. 24), is associated means for guiding plungers 126, which may be urged by Bowdin wires 127 to operate the lever and set the punch. The number of Bowdin wires associated with each lever varies according to the punching combinations in which a given lever is included. In the present showing there are 35 of these wires, extending from the setting carriage of the punching unit to the carriage 80 of the printing unit, above which is mounted a multiple wire guide 127′, into which the ends of the wires are led and connected to plungers 128, which overlie the rear ends of a series of sub-levers 129, mounted above the casing of the carriage 80 on a shaft 130, and having their front ends connected by draw wires 131 to the levers 79 of the printing keys. One of these wires, however, indicated by X in Figure 10, does not contribute to the operation of the actuating or setting levers 49, but is intended to operate an additional bell crank 49a (see Fig. 24) which affects the escapement release in tabulation.

Figure 9:
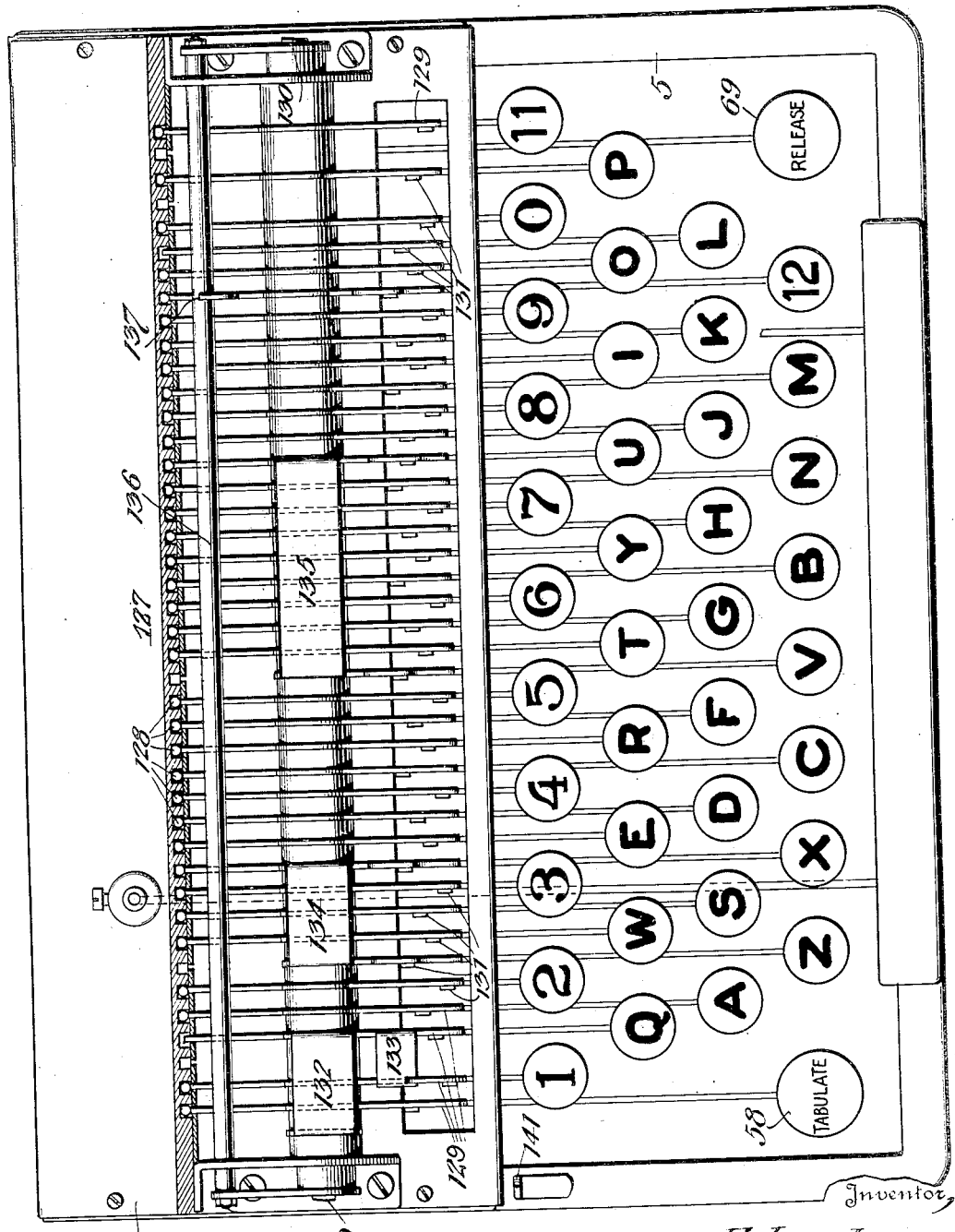

Therefore there are 34 wires designed to perform setting functions upon the operation of 38 keys, and it is therefore evident that certain of these keys must be coupled so that the actuation of either of them will operate the same wire, and set the same punch. This result is accomplished by couplings 132, 133, 134, and 135, each of which bridges a pair of sub-levers 129 (see Figs. 7 and 9, and also the figures of the 11 group). A further permutation is facilitated by what may be called the 12 bail 136, swung loosely from the shaft 130 and engaged by a hook 137 on the sub-lever of the 12 key. Thus any operation of the 12 key will operate a Bowdin wire to set the 12 punch, and likewise the same result will be effected whenever the 12 bail 136 is swung upward by the operation of any other sub-lever that may be arranged to operate the bail. In other words, the 12 punch is intended to be set by an operation of the 12 key, or by the operation of any one of a series of keys whose sub-levers are arranged to operate the 12 bail 136, in addition to the Bowdin wire directly operated by the sub-lever of the key depressed. In the Figure 11 group, what has just been said will appear more clearly.

Each of the keys A to K and 2 to 11, operate a single sub-lever, each of which has a Bowdin wire leading to the actuating levers 49, for the setting devices of the punches 2 to 11. The sub-levers of all of the other keys set the 12 punch as an exponent or addition to the setting of one of the other punches, this result being accomplished by providing each of these sub-levers, or a sub-lever coupled to it, with a bail operating lug 137. For instance, the key-levers of the group of keys l, m, n, o, p, r, s, t, w and y are each provided with a single sub-lever, which has a bail operating lug. The sub-levers of the keys x and z are coupled, and the x sub-lever is provided with the bail operating lug. The u—v sub-levers are coupled, and the u lever is provided with the lug. Q is symbolized by the punching of the 12 and 1. The Q sub-lever has no Bowdin wire of its own, but operates the 12 bail, and its bridge piece 133 operates the sub-lever of the one key while permitting independent operation of the one key sub-lever when the one key is depressed. The sub-lever of the one key operates a single Bowdin wire, since it is not directly coupled to any other sub-lever, and has no 12 bail operating lug. The 12 key sub-lever operates a single Bowdin wire, but is operated not only by the 12 key, but by all other keys except A to K, 2 to 11, and 1. What has just been said will be clearly apparent by an inspection of the Figure 11 group of the drawings, and the diagrammatic showing in Figure 10.

A peculiarity of the arrangement to which attention may be directed, is that the punching for every character in the keyboard is distinctive, either by reason of the location of similar punchings on the sheet, 1 and C, for instance, or by reason of the relation of two punchings, M and N, for instance, except in two instances; the punched designation of U and V are identical, and the same is true of X and Z, for the reason that the sub-levers of the U and V keys are coupled, and operate the same Bowdin wire to set the same punch, and the same is true of X and Z with respect to another punch.

To protect and obscure the upper portion of the machine, a metal cover 138 (see Fig. 28) is hinged at its lower rear corner to the frame of the punching unit, and is held, when swung back, by a system of links 139. The front of this case is located in a vertical plane just in rear of the keyboard, and is provided with a card holder 140, in which is placed a card similar to those being operated upon, and traversed by a pointer or indiator 141, movable with the carriage to indicate to the operator the position of both the printing and punch setting mechanism, with respect to the cards in the machine.

Figure 3:
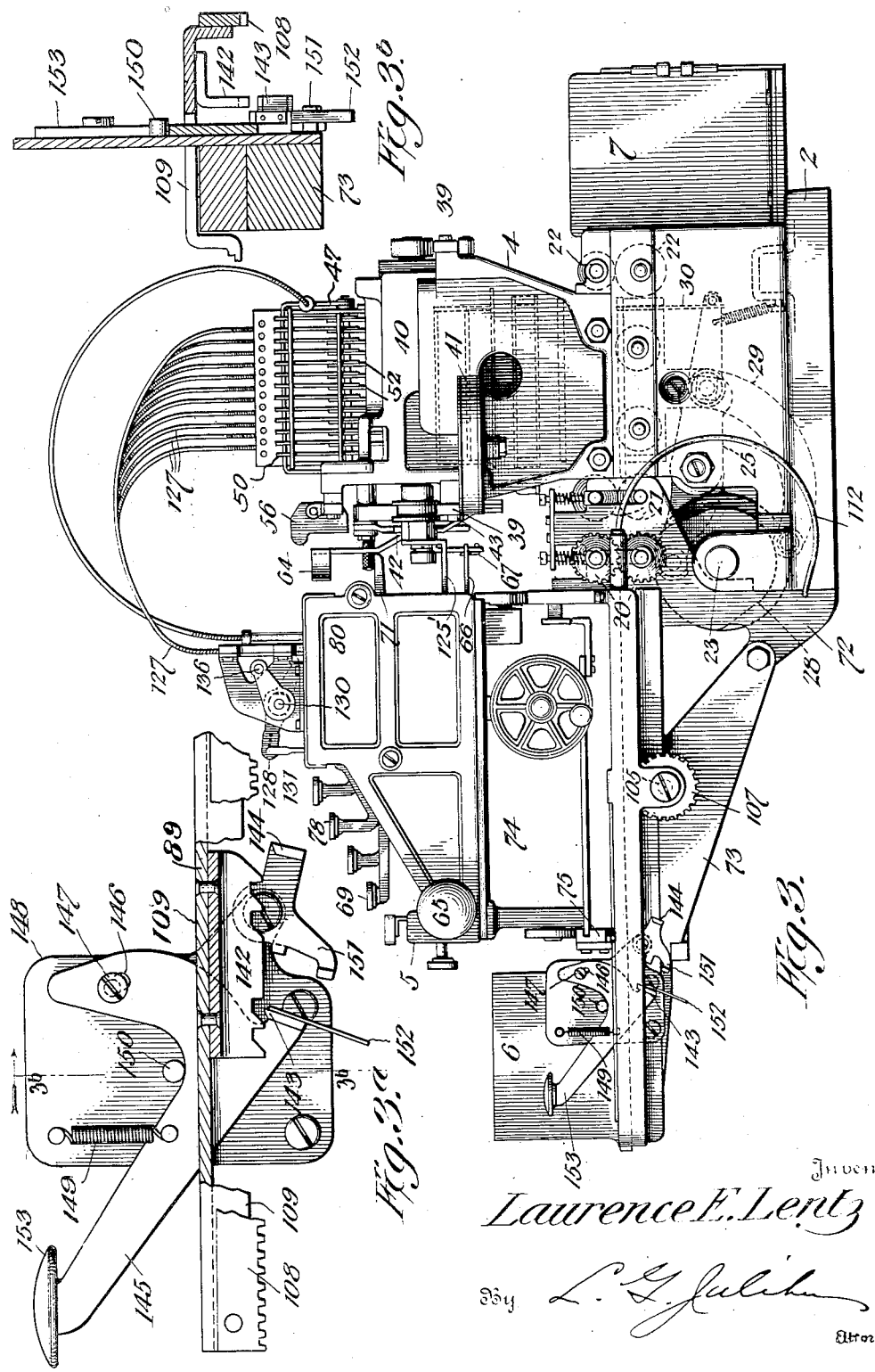
Figure 4:
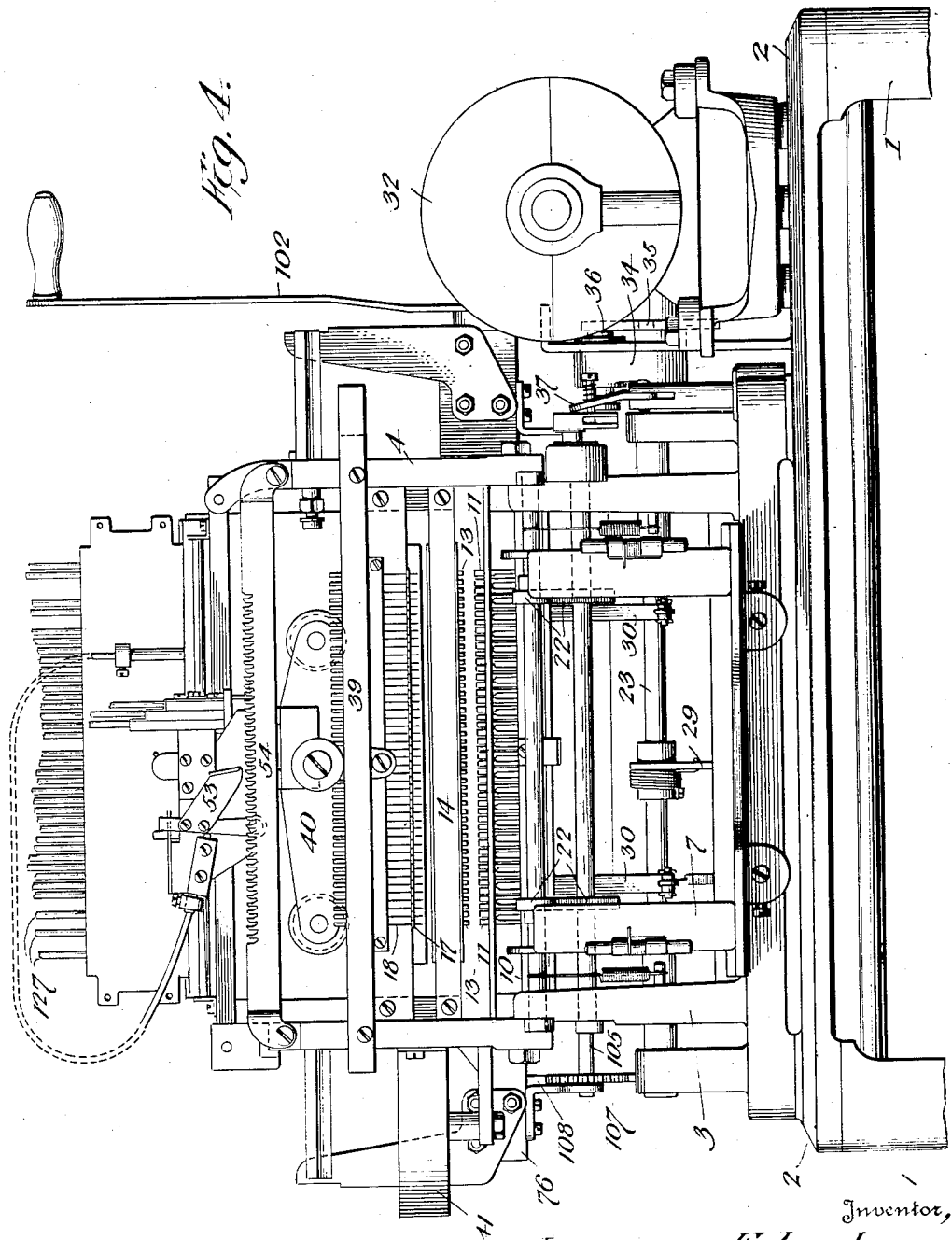

It is sometimes desirable to print more than a single line of characters on the card, and in Fig. 3a is shown a simple form of line spacing mechanism, whereby the card may be line spaced for this purpose. To the rear shuttle section 89, is attached a rack 142, designed to be engaged by a spacing dog 143, and a holding dog 144. The spacing dog is carried by a line spacing lever 145, having a slot 146 engaging a pin 147 projecting from a plate 148 at one side of the hopper 6. A spring 149 serves to draw the lever 145 against a lug 150. The holding dog 144 is formed on a bell crank holding lever 151, one arm of which is disposed in the path of a spring 152 fixed to the spacing dog 143. In the normal position of the parts, the shuttle section 89 will be in its completely retracted position, the card will be in the printing position, and the card engaging hooks of the shuttle section 89 will be in position to engage the edge of the card. If upon completing one line of writing, it is not desired to feed the printed card back to the punching mechanism, but to merely move it the distance of a line space, the line spacing lever 145 is operated by depressing the line space key 153 carried thereby. This serves to swing the lever 145 with the lug 150 as a fulcrum, to permit the spacing dog 143 to move into engagement with the rack. This engaging movement of the lever is accommodated by the slot 146, but further depression of the key 153 will cause the lever 145 to swing from the pin 147 as a fulcrum. This motion will feed the rack 142 back the distance of a line space, and cause it to line space the card. As this movement is completed, the spring 143 will engage the holding lever 151 and swing the latter to cause the holding dog 144 to engage the rack 142.

As the rack and shuttle section are under tension, the engagement of the rack and dog will be maintained to hold the shuttle in its new position, after the key 153 is released and retracted by the spring 149. When, however, the shuttle is moved rearwardly by the operation of the lever 102, the dog 144 will drop away from the rack, and resume its normal position. It will be evident that the described line spacing movement of the shuttle 89 will be accompanied by a limited rotary movement of the pinions 107, since these pinions are engaged by the racks moving with the shuttle. It is for this reason that the full stroke mechanism illustrated in Fig. 5a does not come into operation until limited movement of the lever 102 has been permitted. This line spacing operation will therefore be accompanied by a slight movement of the lever 102, and the tension of its retracting spring will be exerted upon the shuttle section to maintain the engagement with the holding dog in the manner described.

Briefly the operation of the machine is as follows: A stack of cards having been placed in the feed hopper 81, the lever 102 is pulled forward to cause the shuttle to feed the lowermost card to the printing position. By the manipulation of the keys, the data expressed in figures and letters is printed across the top of the card. As each character is printed, one or more punches are set by the operation of one or more sub-levers, and the swinging of one or more of the setting levers 49 through the intermediate wire or wires. The printing and punch selecting mechanisms progressing in unison as the printed record is made, the printed characters and the symbolic punch settings will correspond in spacing with respect to the card being operated upon.

The printing and punch setting for the card located in the printing position having been completed, the handle 102 will again be operated, and the double shuttle will feed the printed card back to the feed rolls of the punch, and will feed another card from the feed hopper to the printing position. While the carriage is being retracted, the previously printed card will be passed back to the punch plate by the feed rolls, the punch plate will be elevated to punch the card, and the punched card will be finally deposited in the delivery hopper at the rear of the machine.

It is thought that from the foregoing, the construction, operation and advantages of the described machine will be clearly apparent, but I reserve the right to effect such modifications and variations of the illustrated structure, as may fall within the scope of the protection prayed.

What I claim is:

1. In a machine of the class described, the combination with a stationary punching unit, including a stationary punch and a travelling punch selecting mechanism, and a travelling printing unit, including a carriage and individually operative type thereon, and arranged to operate the punch selecting mechanism.

2. In a machine of the class described, the combination with stationarily mounted punching mechanism, of a printing unit including a travelling carriage and individually operative type thereon, travelling punch selecting mechanism, and means for feeding a card into position to be operated upon by both the printing and punching mechanisms.

3. In a machine of the class described, the combination with a stationary support and a card platen and card punching mechanism mounted thereon, of a travelling carriage and card printing and punch selecting mechanisms, mounted on and movable with the carriage in cooperative relation to the platen and punching mechanism respectively.

4. In a machine of the class described, the combination with a punching mechanism having a bed plate, of a platen located in substantially the same plane as the bed plate; means for feeding the card in a substantially straight path, first to the platen, and then to the bed plate; printing mechanism cooperating with the platen to print a record on the card; punch selecting mechanism and means for operating the punching mechanism to punch the previously printed card.

5. In a machine of the class described, the combination with punching mechanism, including a die plate, of printing mechanism, including a platen substantially aligned with the die plate; means for guiding the card from the platen to the die plate, punch selecting mechanism, and means for operating the punch selecting mechanism from the printing mechanism.

6. In a machine of the class described, the combination with feed and delivery hoppers, of means for feeding a card in a substantially straight path from one hopper to the other by intermittent stages, and card printing and punching mechanism located between the hoppers to print and punch a card in different stages of its transit from one hopper to the other.

7. In a machine of the class described, the combination with card printing mechanism and card punching mechanism, of reciprocatory feeding means, operative to feed a card to and from the printing mechanism, and rotary feeding means to feed the card to and from the punching mechanism.

8. In a machine of the class described, the combination with card printing mechanism and card punching mechanism, of card feeding mechanisms for feeding a card to the printing and punching mechanisms, and means whereby one of said feeding mechanisms is controlled by the other.

9. In a machine of the class described, the combination with printing mechanism and punching mechanism, of card feeding mechanism associated with the punching mechanism, and a card feeding shuttle associated with the printing mechanism and controlling the operation of the card feeding mechanism.

10. In a machine of the class described, the combination with printing mechanism and punching mechanism, of a double shuttle including successively operating sections for feeding cards to and from the printing mechanism for delivery to the punching mechanism.

11. In a machine of the class described, the combination with card printing mechanism and card punching mechanism, of a double shuttle, means for operating said shuttle to feed cards to and from the printing mechanism, and motor operated card feeding mechanism controlled by the shuttle to feed the card to the punching mechanism.

12. In a machine of the class described, the combination with card printing mechanism and card punching mechanism, of separate card feeding means associated with the printing and punching mechanisms respectively; a separate source of power for operating said separate feeding means, and a device whereby one of said feeding means will be controlled by the other.

13. In a machine of the class described, the combination with card printing mechanism and card punching mechanism, of punch selecting mechanism operated by the printing mechanism, of separate devices for feeding the cards to the printing position and displacing them therefrom, and means automatically controlled in timed relation to displacement of said cards from the printing position and operative to feed said cards to the punching mechanism, and remove them therefrom after punching.

14. In a machine of the class described, the combination with card punching mechanism including punch elements, punch selecting mechanism, punch selecting keys, a series of levers operated by said keys, Bowdin wires extended from said levers to the punch selecting mechanism, and means for coupling certain of said levers.

15. In a machine of the class described, the combination with card punching mechanism including punch elements, of punch selecting mechanism, a series of keys, a series of levers, means for transmitting motion from each of said levers to the punch selecting mechanism, and a bail connected to one of said levers, and arranged to be operated by other of said levers.

16. In a machine of the class described, the combination with card printing mechanism and card punching mechanism, of card feeding mechanism for feeding a card to the printing and punching mechanisms in succession, and a line spacing mechanism operative to line space the card relative to the printing mechanism.

17. In a machine of the class described the combination with printing mechanism and punching mechanism, of card feeding mechanism operative to feed a card to said printing and punching mechanisms in succession, a platen with which the printing mechanism cooperates and movable from the writing plane, and means for automatically moving the platen by operation of the card feeding mechanism.

18. In a machine of the class described, the combination with card printing mechanism and card punching mechanism, of card feeding mechanism for feeding a card to said printing and punching mechanisms in succession and including a part independently operative for line spacing, and means including a key for operating said part.

19. In a card printing and punching machine, the combination with means for printing numerals and all the letters of the alphabet and including printing keys, of card feeding mechanism operative to feed a card to and beyond the printing means by movement in a line spacing direction only, and punching mechanism in the path of movement of the card and automatically operated as an incident to operation of said keys and feeding mechanism to produce a punched record on the card corresponding to any of the letters or numerals printed by said printing means.

20. In a card printing and punching machine, the combination with means for printing numerals and all the letters of the alphabet and including printing keys, of card feeding mechanism operative to feed cards successively to and beyond the printing means by movement in a line spacing direction only, and punching mechanism in the path of movement of the cards and automatically operated as an incident to operation of said keys and feeding mechanism to punch upon a card a record corresponding to any letter or numeral printed thereon, and while a succeeding card is in position to be printed upon by the printing means.

21. In a machine of the class described the combination with card punching mechanism, and a card printing unit including a travelling carriage and individually operative type thereon, of punch selecting mechanism operative as an incident to operation of said type, and card feeding mechanism operative to feed a card into the path of travel of the carriage and type and subsequently conveying said card to said punching mechanism.

22. In a machine of the class described, the combination with card printing and punching mechanisms, respectively, one controlling the other, and a platen for one of said mechanisms, of a feed hopper, a sectional shuttle one section of which operates the other and delivering the cards from the hopper to the platen and said mechanisms, and means for operating the shuttle.

23. In a machine of the class described, the combination with printing and punching mechanisms, respectively, one controlling the other, and a depressible platen for one of said mechanisms, of means for feeding the work to and from the platen of said one mechanism and delivering said work to the other mechanism, and means for depressing said platen to avoid interference with the feeding means.

24. In a machine of the class described the combination with printing and punching mechanisms, respectively, one controlling the other, and a platen for one of said mechanisms and depressible from its normal position, of a feed shuttle operative to depress the platen and feed the work to one of said mechanisms and to subsequently restore the platen to normal position and feed the work toward said other mechanism.

25. In a machine of the class described the combination with printing and punching mechanisms, respectively, one controlling the other, of a two part shuttle for feeding the work from one mechanism toward the other, a drive shaft for one part of the shuttle, and means whereby the driven part will drive the other part after predetermined independent movement.

26. In a machine of the class described the combination with printing and punching mechanisms, respectively, one controlling the other, of card feeding mechanism for feeding a card from one mechanism toward the other and including a shuttle section provided with racks, driving pinions engaging said racks, and a secondary shuttle section operated by the first section after a predetermined independent movement of the first section, and card engaging means carried by said shuttle sections.

27. In a machine of the class described the combination with a field of punches arranged in rows for selective operation of punches in different rows, a row of punch selecting devices having unitary travelling movement to select punches in different rows of said field, a group of keys of greater number than the selecting devices, and means for operating the selecting devices by operation of said keys to effect a distinguishing punch selection for each key and including, direct mechanical motion transmitting connections between the keys and selecting devices.

28. In a machine of the class described the combination with a field of punches arranged in rows for selective operation of punches in different rows, a row of punch selecting devices having unitary travelling movement to select punches in different rows of said field, a group of keys of greater number than the selecting devices, and means for operating the selecting devices by operation of said keys to effect a distinguishing punch selection for each key, and including direct mechanical motion transmitting connections between the keys and selecting devices and between keys of said group.

29. The combination with a typewriting mechanism, including character-typing keys, a stationary card-perforating mechanism including punches and a series of travelling punch indexing mechanisms, of a series of mechanical trains of mechanisms, including permutating means, selectively operable in groups by each operation of the keys to progressively set up the stationary card punches during the travel of said indexing mechanism and during the typing upon the card.

30. In a machine having keys and a card-perforating mechanism having a series of punch-indexing pins, arranged in parallel rows, the combination of movement-transmitting trains of mechanism actuatable by said keys selectively, to set up said punch-indexing pins, row by row, each train including a key actuated interponent and a selector for each punch-indexing pin in the row effective to be operated by certain of said interponents, each selector having means effective to control the operation thereof by the interponents of the different keys, and means operative to subsequently perforate a card according to the setting of the indexed pins.

31. In a machine having typing instrumentalities including keys and a card-perforator having a plurality of rows of stationary punches, the combination of a punch indexing device including a single row of travelling punch-set-up elements, a carriage to support said elements and means to move the same to register with any row of punches, movement-transmitting mechanism actuatable by the keys to actuate said indexing devices, including a series of selectors, one for each element, and a plurality of key-driven interponents, one for each key, effective to actuate said selectors, means associated with the selectors and interponents, effective to set up said elements in groups, by one actuation of the key, according to a predetermined plan to represent, by perforations in the card, the character typed by each operation of said instrumentalities, and means to perforate the card after the selected punches have been set up.

32. In a machine having typing instrumentalities including keys and a card-perforator having a plurality of rows of stationary punches, the combination of a punch-indexing device including a single row of travelling punch-set-up elements and a carriage to support said elements and register the same with any row of punches, movement-transmitting mechanism actuable by the keys to actuate said indexing device, including a series of selectors, one for each element, and a plurality of key-driven interponents, one for each key, effective to actuate said selectors, means effective to actuate certain groups of said selectors by the interponents at each operation of the keys, effective to set up said elements in groups, by one actuation of the key, according to a predetermined plan to represent, by perforations in the card, the character typed by each operation of said instrumentalities, and means to perforate the card after the selected punches have been set up.

In testimony whereof I affix my signature.

LAWRENCE E. LENTZ.